(12) United States Patent
Mizusawa

(10) Patent No.: US 8,184,150 B2
(45) Date of Patent: May 22, 2012

(54) MICROSCOPE DEVICE AND CONTROLLER THEREOF

(75) Inventor: Daisuke Mizusawa, Tokyo (JP)

(73) Assignee: Olympus Corporation, Tokyo (JP)

( * ) Notice: Subject to any disclaimer, the term of this patent is extended or adjusted under 35 U.S.C. 154(b) by 1188 days.

(21) Appl. No.: 12/002,893

(22) Filed: Dec. 19, 2007

(65) Prior Publication Data
US 2008/0155452 A1 Jun. 26, 2008

(30) Foreign Application Priority Data
Dec. 26, 2006 (JP) ................................. 2006-348948

(51) Int. Cl.
*H04N 7/18* (2006.01)
*H04N 5/225* (2006.01)
(52) U.S. Cl. ............... 348/79; 348/68; 348/80; 348/207
(58) Field of Classification Search .................... 348/68, 348/79, 80, 207.11
See application file for complete search history.

(56) References Cited

U.S. PATENT DOCUMENTS

| 2001/0045506 | A1* | 11/2001 | Masuyama | 250/201.3 |
| 2002/0075563 | A1* | 6/2002 | Aizaki et al. | 359/363 |
| 2003/0112330 | A1* | 6/2003 | Yuri et al. | 348/80 |
| 2004/0105000 | A1* | 6/2004 | Yuri | 348/79 |
| 2005/0141066 | A1* | 6/2005 | Ouchi | 359/15 |
| 2006/0066856 | A1* | 3/2006 | Cummings et al. | 356/402 |
| 2006/0120603 | A1* | 6/2006 | Li et al. | 382/181 |
| 2007/0126866 | A1* | 6/2007 | Uchida | 348/79 |
| 2007/0253056 | A1* | 11/2007 | Tanemura et al. | 359/363 |
| 2008/0219529 | A1* | 9/2008 | Alexandrov et al. | 382/128 |

FOREIGN PATENT DOCUMENTS

| JP | 7-168101 A | 7/1995 |
| JP | 8-21957 A | 1/1996 |
| JP | 2000-056229 A | 2/2000 |
| JP | 2002-182114 A | 6/2002 |

* cited by examiner

*Primary Examiner* — Karen Tang
(74) *Attorney, Agent, or Firm* — Holtz, Holtz, Goodman & Chick, PC

(57) ABSTRACT

A controlling unit obtains microscope information about each configuration unit configuring a microscope main body, transmits the microscope information, receives control information, and controls the operation of each configuration unit based on the received control information. A controller receives the microscope information transmitted from the controlling unit, displays an operation screen on which an operation button display used to obtain an instruction for the operation of each configuration unit is arranged based on the microscope information, obtains the instruction issued by using the operation button display, and transmits to the controlling unit the control information corresponding to the obtained instruction.

14 Claims, 13 Drawing Sheets

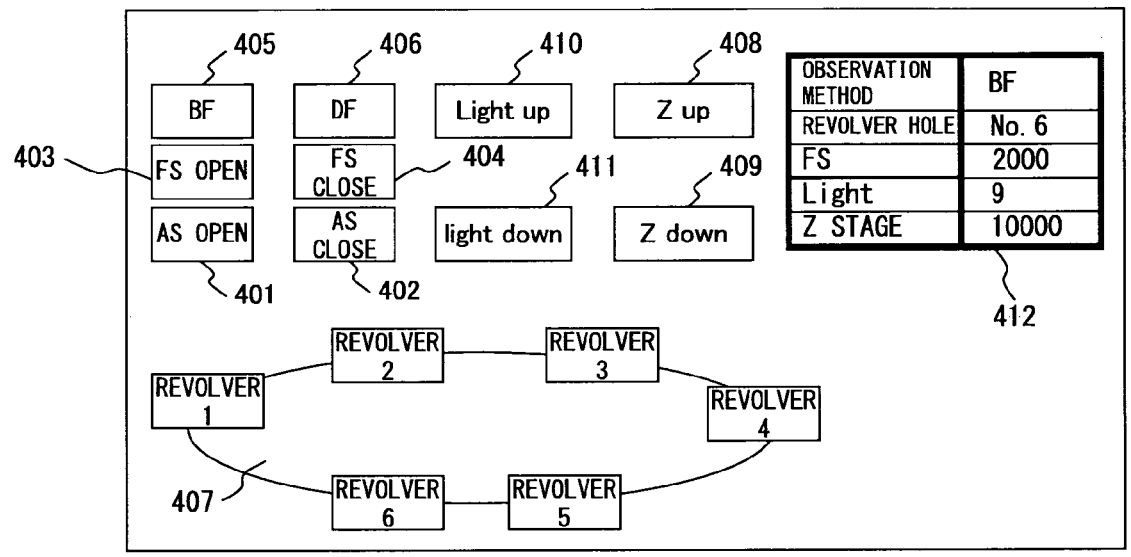
F I G. 4 A

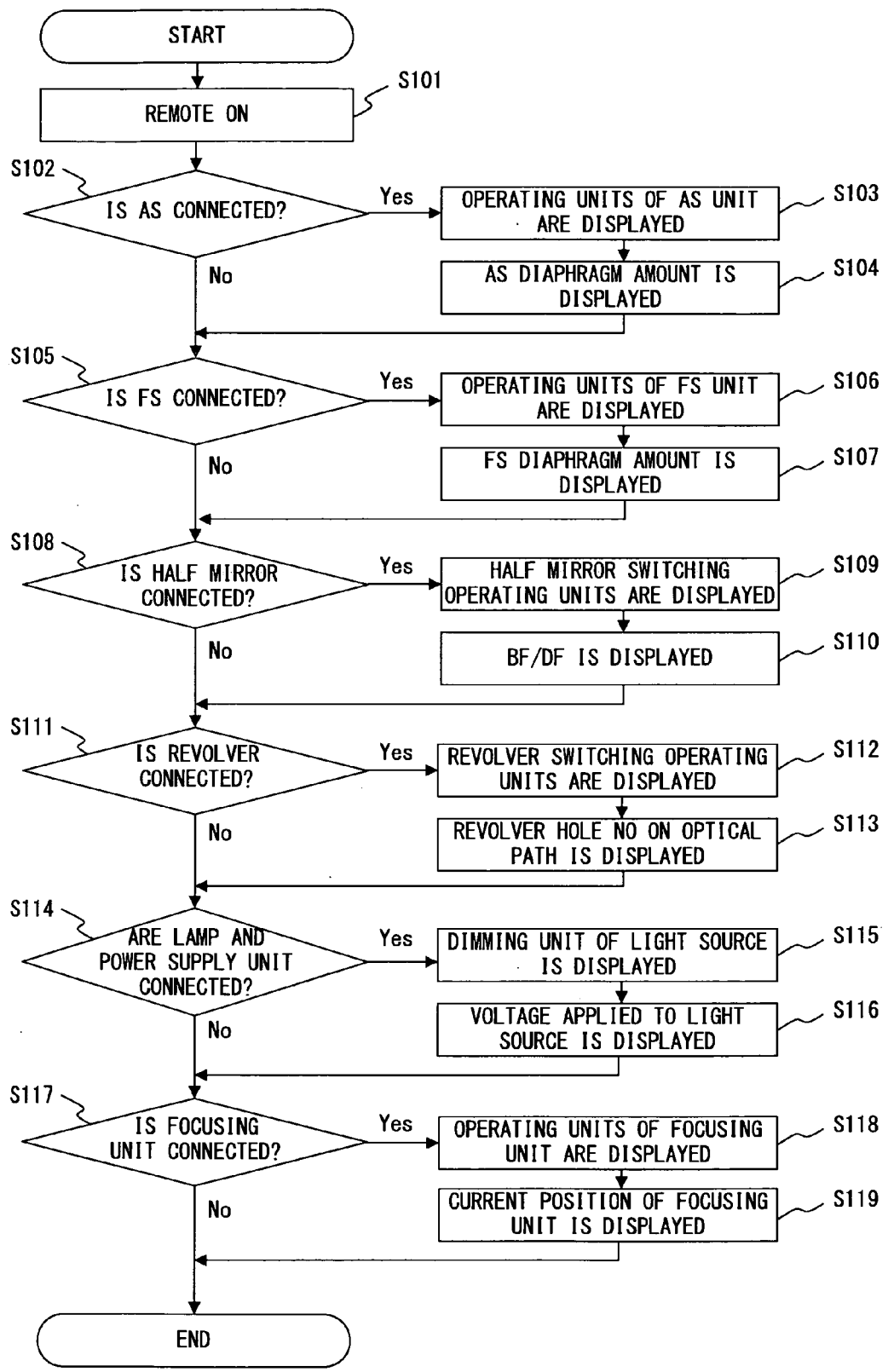
F I G. 5

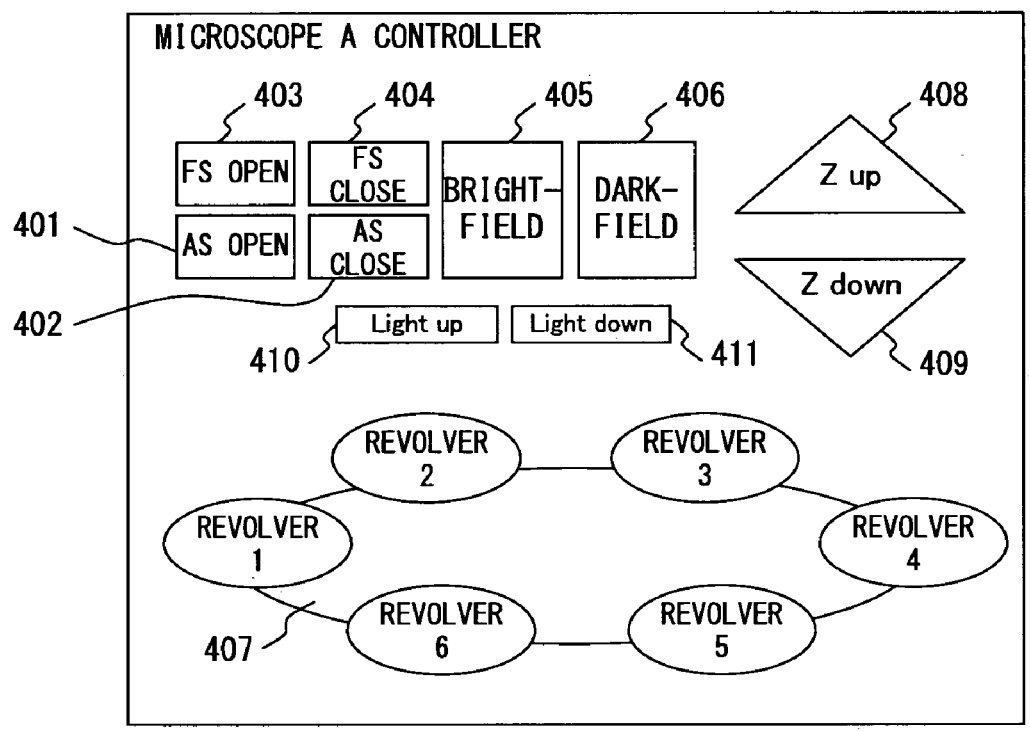
F I G. 6 A

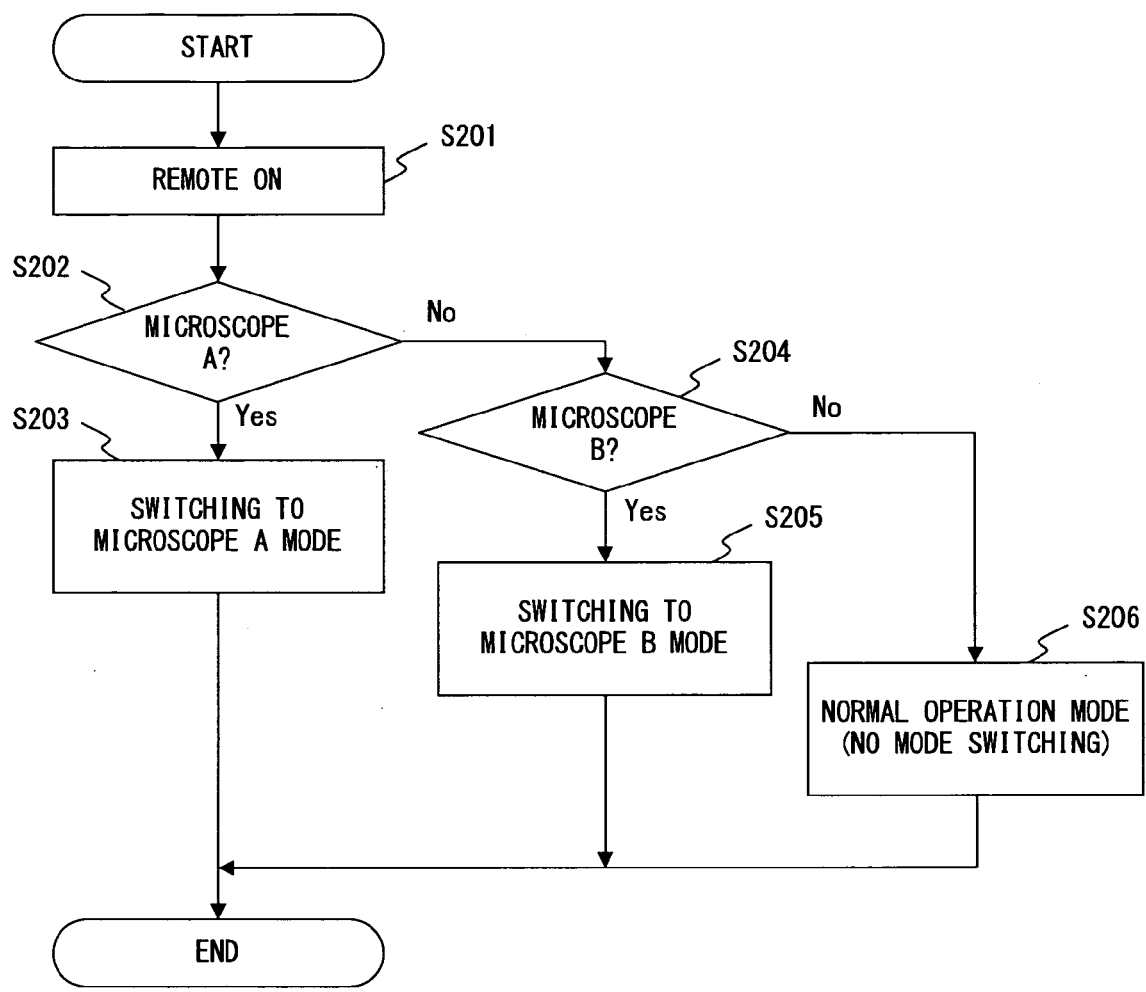
F I G. 7

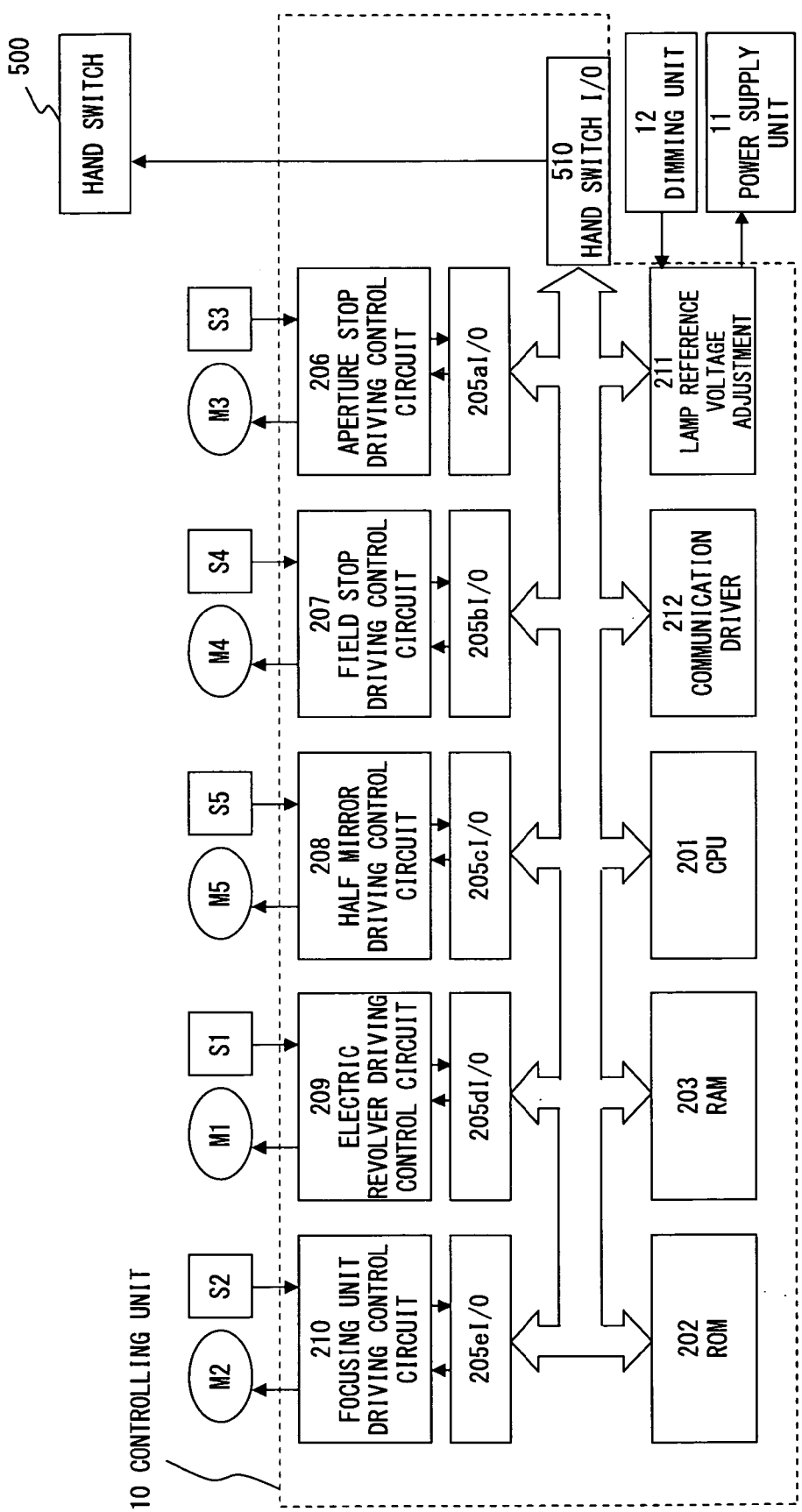
F I G. 9

MICROSCOPE DEVICE AND CONTROLLER THEREOF

CROSS REFERENCE TO RELATED APPLICATIONS

This application claims benefit of Japanese Application No. 2006-348948, filed Dec. 26, 2006, the contents of which are incorporated by this reference.

BACKGROUND OF THE INVENTION

1. Field of the Invention

The present invention relates to a technique of a microscope, and more particularly, to a technique for improving the operability of a microscope.

2. Description of the Related Art

Microscopes and optical examining devices using a microscope are used for various purposes such as observation of cells, a body tissue, etc. in a medical/biological field, examinations of a semiconductor wafer, an FPD (Flat Panel Display) glass substrate, a magnetic head, etc., research and development of a metal structure, a new material, or the like in industrial fields, and there are diverse devices responding to user needs.

When a sample is observed with such a microscope, various types of configuration units (such as various types of illumination, an aperture stop, a field stop, a revolver, an automatic focusing mechanism, a mechanism for switching an optical element such as a lens, a filter, etc.), which configure the microscope, must be operated according to an observation condition.

As a method for operating these configuration units, for example, a method for connecting an operating device to a microscope main body, for driving each of the configuration units according to an operation performed for the operating device, and for grasping the driving state of each of the configuration units according to a display on the operating device is generally known. Namely, with this method, the operating device such as a controller, a PC (Personal Computer), etc., which is dedicated to each microscope, is connected to the microscope main body via a communication cable, and various types of settings are made with the driving control of the configuration units by transmitting/receiving a command to/from the microscope main body according to an operation performed for the operating device.

Such an operating device normally comprises a display unit for displaying information about a configuration unit desired by an operator of a microscope. However, diverse microscope devices and optical examining devices currently exist for various uses or purposes as described above. Also connectable configuration units are diversified in a system microscope configured by combining configuration units, and hence there are a large number of choices of optical elements to be used. For this reason, the amount of information about configuration units and optical elements, which is displayed on the above described operating device, becomes large depending on the configuration of an actually used device, and on the contrary, it becomes difficult for an observer to grasp information required for an observation. As a result, the operability and the advantages of the operating device are degraded in some cases.

As a solution to such a problem, for example, there is the technique disclosed by Japanese Published Unexamined Patent Application No. 2002-182114.

With this technique, a microscope main body and a controller are initially connected via a cable. Then, the controller is made to read information about optical units (such as a revolver unit, a filter unit, and a condenser unit, which comprise various types of optical elements) that are connected to the microscope main body, and only the information about optical elements arranged on the optical path of the microscope among the read information is displayed on the display unit of the controller as necessary information. Here, all of pieces of information about optical elements provided in an optical unit to be switched are listed and displayed when an optical element is switched within the optical unit.

With this technique, the operability is improved by displaying only minimum information required for an observation at the time of the normal observation although all of pieces of information related to a switching operation are displayed when the switching operation is performed for an optical element as described above.

However, the above described technique can cause the following problem.

Normally, a controller designed to be dedicated to a microscope is used. If a controller of one type is used for a microscopes or an optical examining device of another type, a problem sometimes occurs.

For example, if the same controller is connected to a microscope or an optical examining device of a different type, an operating unit, a function display, etc. for a configuration unit, which is not comprised by the connected microscope or the connected device, are sometimes included in the operating unit of the controller. More specifically, for example, if a controller for a biological microscope is connected to an industrial microscope, an operating unit and a function display, by way of example, for a fluorescent observation unit, etc., which do not exist in the connected industrial microscope, remain. At this time, there is a possibility that an operator of the microscope erroneously recognizes a configuration unit or an optical element, which is comprised by the currently used microscope main body, or erroneously operates an operating unit that does not function at all.

Additionally, for a controller designed to be dedicated to a microscope, correspondences between various types of operation instruments provided on an operating unit and various types of optical members driven according to an operation are fixed. Accordingly, for example, if a configuration unit is newly added to a microscope main body, the added unit cannot be driven with an operation performed for the controller. Furthermore, if a configuration unit that becomes no longer necessary is detached, an operating unit for driving the detached unit is left unfunctional in the controller. This causes erroneous recognition or an erroneous operation in a similar manner.

SUMMARY OF THE INVENTION

A microscope device according to one preferred embodiment of the present invention is a microscope device for obtaining an image of a sample to be observed, and is characterized in comprising a microscope information obtaining unit for obtaining microscope information, which is information about each configuration unit configuring the microscope device, a controller for receiving the microscope information and for transmitting control information for controlling the operation of the configuration unit, a main body side transmitting/receiving unit for transmitting the microscope information to the controller and for receiving the control information from the controller, and a main body side controlling unit for controlling the operation of the configuration unit based on the control information received by the main body side transmitting/receiving unit, wherein the controller comprises a controller side transmitting/receiving unit for receiving the microscope information transmitted from the main body side transmitting/receiving unit and for transmitting the control information to the main body side transmitting/receiving unit, a displaying unit for displaying an operation screen on which an operation button display used to obtain an instruction for the operation of the configuration unit is arranged based on the microscope information received by the controller side transmitting/receiving unit, an instruction obtaining unit for obtaining the instruction by using the operation button display, and a controller side controlling unit for causing the controller side transmitting/receiving unit to transmit the control information, which corresponds to the instruction obtained by the instruction obtaining unit, by controlling the controller side transmitting/receiving unit.

Also a controller, which is comprised by the above described microscope device according to the present invention and comprises the controller side transmitting/receiving unit, the displaying unit, the instruction obtaining unit, and the controller side controlling unit, is related to the present invention.

BRIEF DESCRIPTION OF THE DRAWINGS

The present invention will be more apparent from the following detailed description when the accompanying drawings are referenced.

FIG. 4A shows a first example of an operation screen according to a first preferred embodiment;

FIG. 5 is a flowchart showing the contents of an operation screen display process according to the first preferred embodiment;

FIG. 6A shows a first example of an operation screen according to a second preferred embodiment;

FIG. 7 is a flowchart showing an operation screen display process according to the second preferred embodiment;

FIG. 9 shows a second example of the internal configuration of the controlling unit in the microscope device shown in FIG. 1;

DESCRIPTION OF THE PREFERRED EMBODIMENTS

Figure 1:
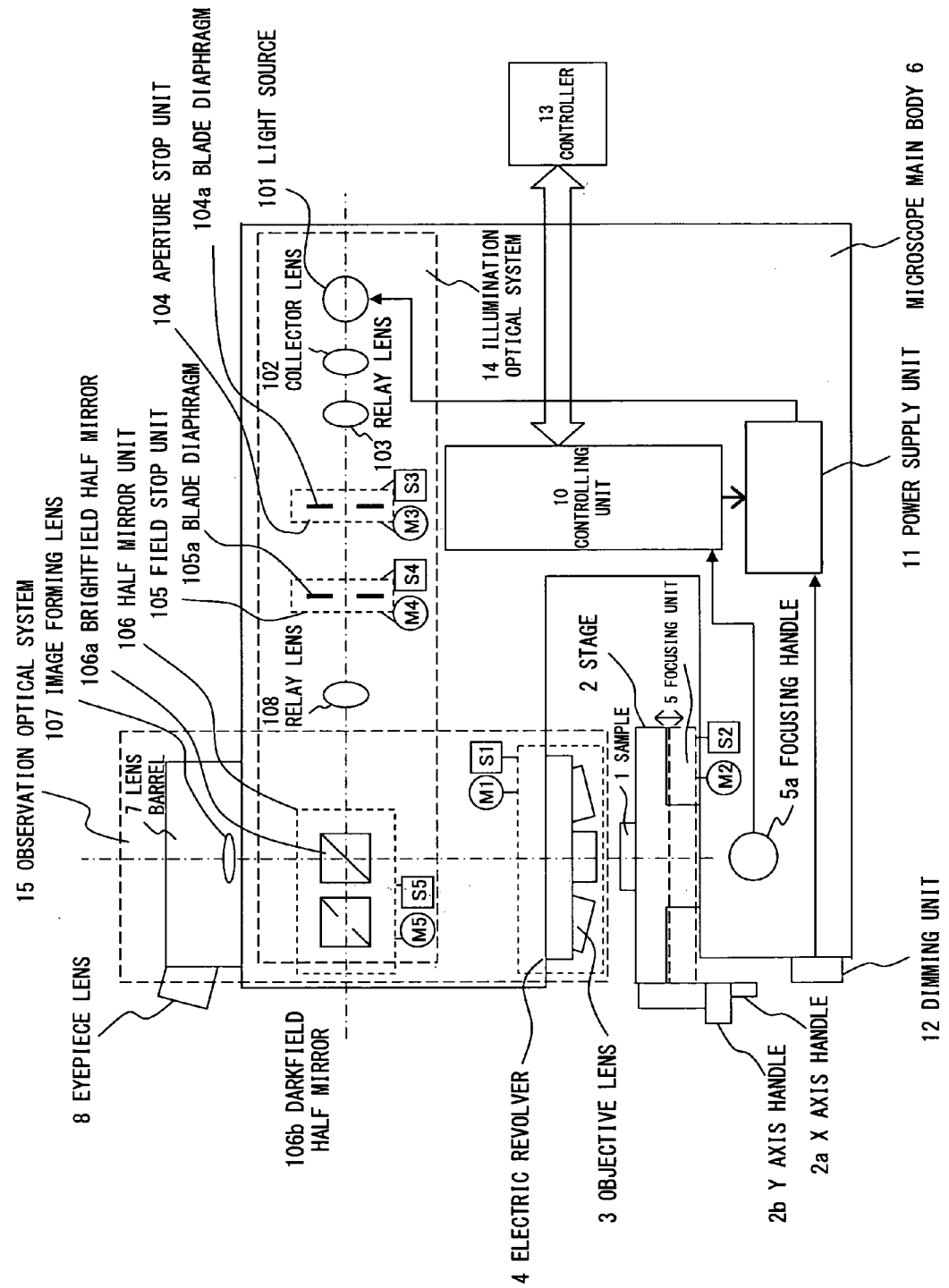
FIG. 1 shows a configuration of a microscope device for carrying out the present invention.

Preferred embodiments according to the present invention are described below with reference to the drawings.

Note that the present invention is not limited to these preferred embodiments.

The description is provided by denoting the same constituent elements with the same reference numerals in the drawings.

First Preferred Embodiment

FIG. 1 is described. This figure shows a configuration of a microscope device for carrying out the present invention.

The microscope device shown in FIG. 1 is configured by comprising a stage 2, objective lenses 3, a microscope main body 6, a lens barrel 7, an eyepiece lens 8, a controlling unit 10, a power supply unit 11, a dimming unit 12, and a controller 13. A sample 1 is placed on the stage 2, and the objective lenses 3 are arranged above the sample 1. The microscope main body 6 holds the objective lenses 3 via an electrical revolver 4, and supports the stage 2 via a focusing unit 5. The lens barrel 7 is arranged on the top of the microscope main body 6, and the eyepiece lens 8 is attached to the front of the lens barrel 7. The controlling unit 10 is provided in the microscope main body 6, and electrically connected to the power supply unit 11 and the dimming unit 12. Operation instruments operated by an operator of the microscope are provided on the controller 13.

The stage 2 can be freely moved on a plane orthogonal to the optical axis of the objective lens 3 by rotating an X axis handle 2a and a Y axis handle 2b. By freely moving the stage 2, the observation position of the sample 1 relative to the objective lens 3 can be moved.

The objective lenses 3 of different magnification factors are mounted to be freely attachable/detachable to/from the electric revolver 4, and one of the objective lenses 3 is selected according to the revolution driving of the electric revolver 4, and positioned above the sample 1.

A maximum of six objective lenses 3 can be mounted in the electric revolver 4 in this preferred embodiment, and numbers #1 to #6 are assigned to objective lens mounting holes not shown. The electric revolver 4 is a unit composed of a mounter, which is not shown, for mounting the objective lenses 3, a revolver motor M1 for inserting the objective lenses 3 in the optical axis by electrically driving the mounter, and a revolver sensor group S1.

The revolver sensor group S1 is composed of a revolver connection sensor, a hole number sensor, and a move completion sensor, which are not shown. The revolver connection sensor detects whether or not the electric revolver 4 is connected to the microscope main body 6. The hole number sensor detects the hole number in which the objective lens 3, which is selected by the revolution driving of the electric revolver 4 and currently inserted in the optical axis, is mounted. The move completion sensor detects the completion of insertion of the objective lens 3 in the optical axis.

The focusing unit 5 is a unit composed of a focusing handle 5a for conveying a rotation operation to the controlling unit 10, a focusing unit motor M2 for electrically driving the focusing unit 5 according to a control signal received from the controlling unit 10, and a focusing unit sensor group S2. The focusing unit sensor group S2 is composed of a focusing unit connection sensor, which is not shown, for detecting whether or not the focusing unit 5 is connected to the microscope main body 6, and a position detection sensor, which is not shown, for detecting the current position of the stage 2 in the direction of the optical axis. The focusing unit 5 changes a relative distance between the sample 1 and the objective lens 3 based on the rotation operation of the focusing handle 5a by moving the stage 2 up and down in the direction of the optical axis (in a Z direction) according to a control signal transmitted from the controlling unit 10. The sample 1 can be positioned in the focus of the objective lens 3 by changing the relative distance.

The sample 1 is illuminated with an illumination optical system 14. Light reflected from the sample 1 passes through an observation optical system 15 and propagates to the eyepiece lens 8, whereby the sample 1 can be observed with the microscope. The illumination optical system 14 is composed of a light source 101, a collector lens 102, a relay lens 103, an aperture stop unit 104, a field stop unit 105, a relay lens 108, and a half mirror unit 106. The illumination optical system 14 is arranged within the microscope main body 6.

The light source 101 is a configuration unit that emits illumination light according to a voltage applied from the power supply unit 11. For example, a lamp light source such as a halogen lamp, etc. is used as the light source 101. Dimming of the light source 101 can be made. Namely, the power supply unit 11 adjusts the voltage applied to the light source 101 based on a reference voltage adjusted according to an operation performed for the dimming unit 12, whereby the dimming is made. In the power supply 11 that is one of the configuration units, an optical lamp connection sensor S6 for detecting whether or not the light source 101 and the power supply unit 11 are electrically connected is provided.

The aperture stop unit 104 is a unit composed of a blade diaphragm 104a, an aperture stop driving motor M3, and an aperture stop sensor group S3. The blade diaphragm 104a has a structure where a plurality of diaphragm blades continuously and concentrically trans form to open/close the diaphragm. The aperture stop driving motor M3 electrically drives the blade diaphragm 104a upon receipt of a control signal from the controlling unit 10. The aperture stop sensor group S3 is composed of an aperture stop connection sensor, which is not shown, for detecting whether or not the aperture stop unit 104 is electrically connected to the microscope main body 6, and an aperture stop hole diameter sensor, which is not shown, for detecting the hole diameter of the blade diaphragm 104a. An operator of the microscope can set the hole diameter of the blade diaphragm 104a by operating the controller 13.

The field stop unit 105 is composed of a blade diaphragm 105a, a field stop driving motor M4, and a field stop sensor group S4. The blade diaphragm 105a has a structure where a plurality of diaphragm blades continuously and concentrically transform to open/close the diaphragm. The field stop driving motor M4 electrically drives the blade diaphragm 105a upon receipt of a control signal from the controlling unit 10. The field stop sensor group S4 is composed of a field stop connection sensor, which is not shown, for detecting whether or not the field stop unit 105 is electrically connected to the microscope main body 6, and a field stop hole diameter sensor, which is not shown, for detecting the hole diameter of the blade diaphragm 105a. An operator of the microscope can set the hole diameter of the blade diaphragm 105a by operating the controller 13.

The observation optical system 15 is composed of the objective lenses 3, the half mirror unit 106, and an image forming lens 107. Here, the half mirror unit 106 is shared by the illumination optical system 14 and the observation optical system 15. The half mirror unit 106 branches the optical path. In the observation optical system 15, illumination light irradiated on the sample 1 passes through the objective lens 3 and the half mirror unit 106 after being reflected as observation light, and is collected by the image forming lens 107 provided within the lens barrel 7, so that the observation image of the sample 1 is formed. This observation image is formed on a predetermined image forming plane via the image forming lens 107 provided within the lens barrel 7, and visually observed via the eyepiece lens 8.

The half mirror unit 106 is a unit composed of a brightfield half mirror 106a, a darkfield half mirror 106b, a half mirror driving motor M5, and a half mirror sensor group S5. Here, the brightfield half mirror 106a is intended to make Koehler illumination by forming the image of the light source 101 in the position of the pupil of the objective lens 3. The darkfield half mirror 106b is intended to reflect only the outer circumference of illumination light flux from the light source 101, and to guide the reflected light to a ring-shaped darkfield illumination optical path in the electric revolver 4 and the objective lens 3. The half mirror driving motor M5 electrically inserts either of the half mirrors 106a and 106b in the optical axis upon receipt of a control signal from the controlling unit 10. The half mirror sensor group S5 is composed of a half mirror unit connection sensor, which is not shown, for detecting whether or not the half mirror unit 106 is connected to the microscope main body 6, and a move completion sensor, which is not shown, for detecting the completion of insertion of the half mirror 106a or 106b in the optical axis. An operator of the microscope can set the insertion/extraction of the half mirrors 106a and 106b in/from the optical axis by operating the controller 13.

Figure 2:
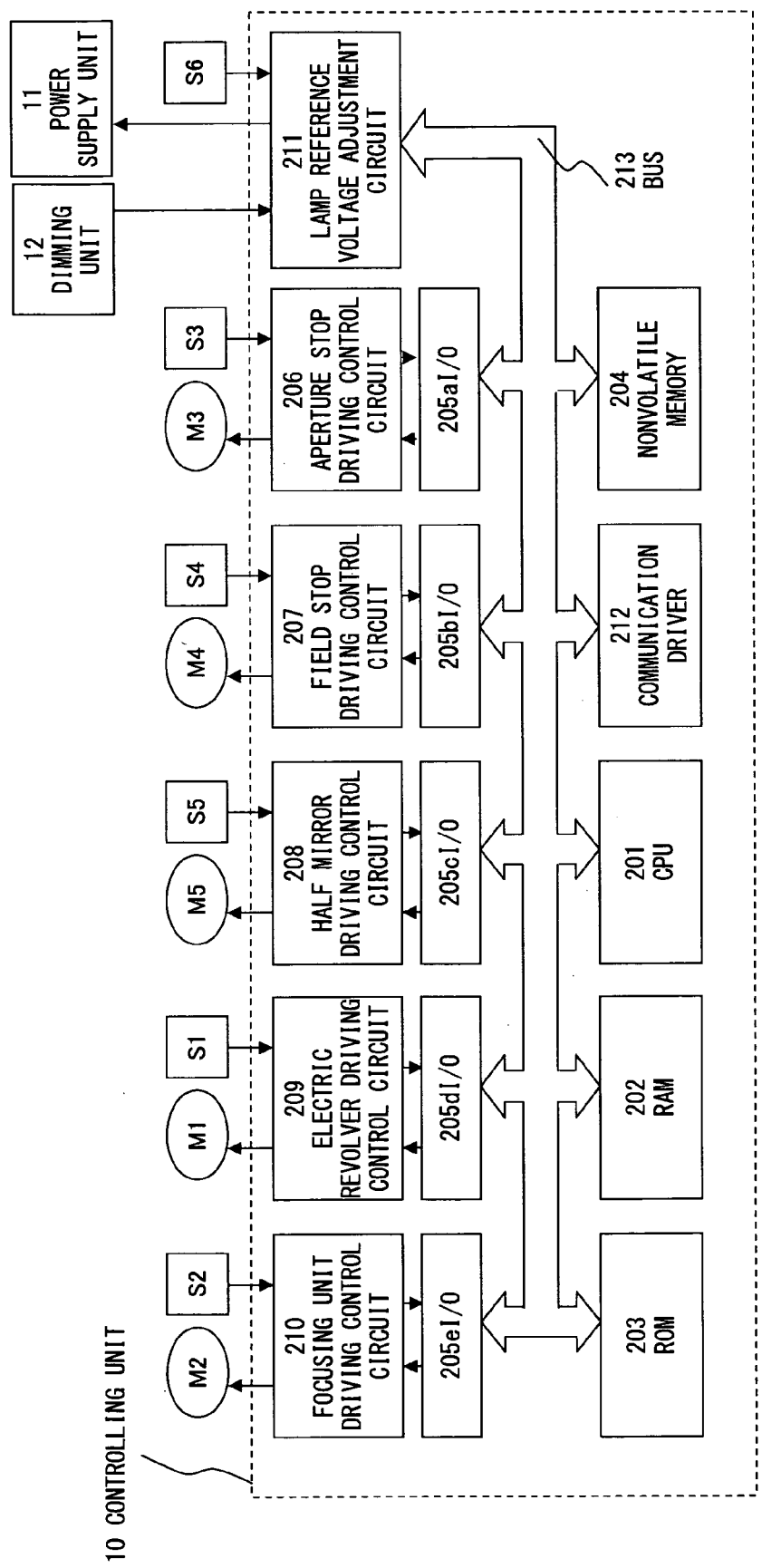
FIG. 2 shows a first example of an internal configuration of a controlling unit in the microscope device shown in FIG. 1.

FIG. 2 is described here. This figure shows a first example of an internal configuration of the controlling unit 10.

The controlling unit 10 in this preferred embodiment is configured by comprising a CPU 201, a RAM 202, a ROM 203, a nonvolatile memory 204, various types of I/Os 205a to 205e, a lamp reference voltage adjustment circuit 211, and a communication driver 212. Various types of data can be mutually exchanged among these constituent elements via a bus 213 under the control of the CPU 201. In addition to these constituent elements, the controlling unit 10 is configured by further comprising driving control circuits 206 to 210 for respectively controlling the driving of the configuration units connected to the microscope device shown in FIG. 1.

The CPU (Central Processing Unit) 201 controls the operations of the entire microscope device shown in FIG. 1.

The RAM 202 is used as a working storage area when the CPU 201 executes a control program, and intended to temporarily store various types of data.

In the ROM 203, a control program that the CPU 201 executes to control the operations of the microscope device is prestored.

In the nonvolatile memory 204, microscope information about the microscope device shown in FIG. 1 is prestored.

The microscope information includes type identification information for identifying the type of a microscope device, configuration unit identification information for identifying various types of configuration units connected to the microscope main body 6, information indicating the states of optical members within each configuration unit, and other items of information. All of these items of information are transmitted from the sensor groups S1 to S6 provided in the configuration units to the controlling unit 10. In the nonvolatile memory 204, the type identification information of the microscope device, and the information for identifying various types of configuration units connected to the microscope main body 6 among these items of microscope information are stored.

The aperture stop driving control circuit 206 is intended to control the driving of the aperture stop driving motor M3 and the aperture stop sensor group S3, which are provided in the aperture stop unit 104, and can exchange various types of data with the other constituent elements of the controlling unit 10 via the I/O 205a. The aperture stop driving control circuit 206 continuously changes the diaphragm diameter of the blade diaphragm 104a by driving the aperture stop driving motor M3 that is a stepping motor. The aperture stop driving control circuit 206 can receive information about the diaphragm diameter of the blade diaphragm 104a, which is detected by the aperture stop sensor group S3, and adjusts the diaphragm diameter of the blade diaphragm 104a to a predetermined value.

The field stop driving control circuit 207 is intended to control the driving of the field stop driving motor M4 and the field stop sensor group S4, which are provided in the field stop unit 105, and can exchange various types of data with the other constituent elements of the controlling unit 10 via the I/O 205b. The field stop driving control circuit 207 continuously changes the diaphragm diameter of the blade diaphragm 105a by driving the field stop driving motor M4 that is a stepping motor. The field stop driving control circuit 207 can receive information about the diaphragm diameter of the blade diaphragm 105a, which is detected by the field stop sensor group S4, and adjusts the diaphragm diameter of the blade diaphragm 105a to a predetermined value.

The half mirror driving control circuit 208 is intended to control the driving of the half mirror driving motor M5 and the half mirror sensor group S5, which are provided in the half mirror unit 106, and can exchange various types of data with the other constituent elements of the controlling unit 10 via the I/O 205c. The half mirror driving control circuit 208 inserts the brightfield half mirror 106a and the darkfield half mirror 106b in the illumination optical path by driving the half mirror driving motor M5. The half mirror driving control circuit 208 can receive information about the insertion/extraction states of the brightfield half mirror 106a and the darkfield half mirror 106b, which are detected by the half mirror sensor group S5. The half mirror driving control circuit 208 inserts the brightfield half mirror 106a in the illumination optical path when illumination is made in the brightfield, or inserts the darkfield half mirror 106b in the illumination optical path when illumination is made in the darkfield.

The electric revolver driving control circuit 209 is intended to control the driving of the revolver motor M1 and the revolver sensor group S1, which are provided in the electric revolver 4, and can exchange various types of data with the other constituent elements of the controlling unit 10 via the I/O 205d. The electric revolver driving control circuit 209 revolves the electric revolver 4 clockwise or counterclockwise by driving the revolver motor M1. The electric revolver driving control circuit 209 can receive information about an objective lens 3, which is inserted in the optical axis and detected by the revolver sensor group S1, and inserts a desired objective lens 3 in the illumination optical path.

The focusing unit driving control circuit 210 is intended to control the driving of the focusing unit motor M2 and the focusing unit sensor group S2, which are provided in the focusing unit 5, and can exchange various types of data with the other constituent elements of the controlling unit 10 via the I/O 205e. The focusing unit driving control circuit 210 moves the stage 2 in the Z direction by driving the focusing unit motor M2 that is a stepping motor. The focusing unit driving control circuit 210 can receive the position of the stage 2 in the Z direction, which is detected by the focusing unit sensor group S2, and moves the stage 2 to a desired position in the Z direction.

The lamp reference voltage adjustment circuit 211 is intended to control the driving of the optical lamp connection sensor S6 provided in the power supply unit 11, and to adjust the voltage applied to the light source 101 based on a reference voltage set according to the contents of an operation in the dimming unit 12. When an arbitrary reference voltage between a ground potential (0 volt) and a power supply voltage is input, the lamp reference voltage adjustment circuit 211 outputs to the power supply unit 11 a lamp set voltage that is obtained with an arithmetic operation performed based on the input reference voltage. The power supply unit 11 applies the voltage, which is an amplification result of the lamp set voltage, to the halogen lamp that is the light source 101.

The communication driver 212 is intended to manage a data communication (such as a serial communication) with the controller 13, to transmit microscope information, etc. to the controller 13, or to receive control information, etc. transmitted from the controller 13.

The controller 13 is described next.

The controller 13 is connected to the microscope main body 6 via a cable. Additionally, application software not shown is preinstalled in the controller 13. By using this application software, a control instruction according to an operation performed by an operator can be issued to the microscope device.

To operate the microscope device by using the application software, the microscope main body 6 is initially switched to a remote operation state by transmitting a REMOTE command from the application software to the controlling unit 10. The microscope main body 6 ignores an input to input means, which is comprised by the microscope main body 6 and not shown, in the remote state.

In contrast, to switch the microscope main body 6 from the remote state to a state (local state) where the microscope device can be operated with the above described input means, a LOCAL command may be transmitted from the application software to the controlling unit 10. When the microscope main body 6 enters the local state in this way, operations of the microscope device, which are performed by the application software, except for the transmission of the REMOTE command are ignored.

Figure 3:
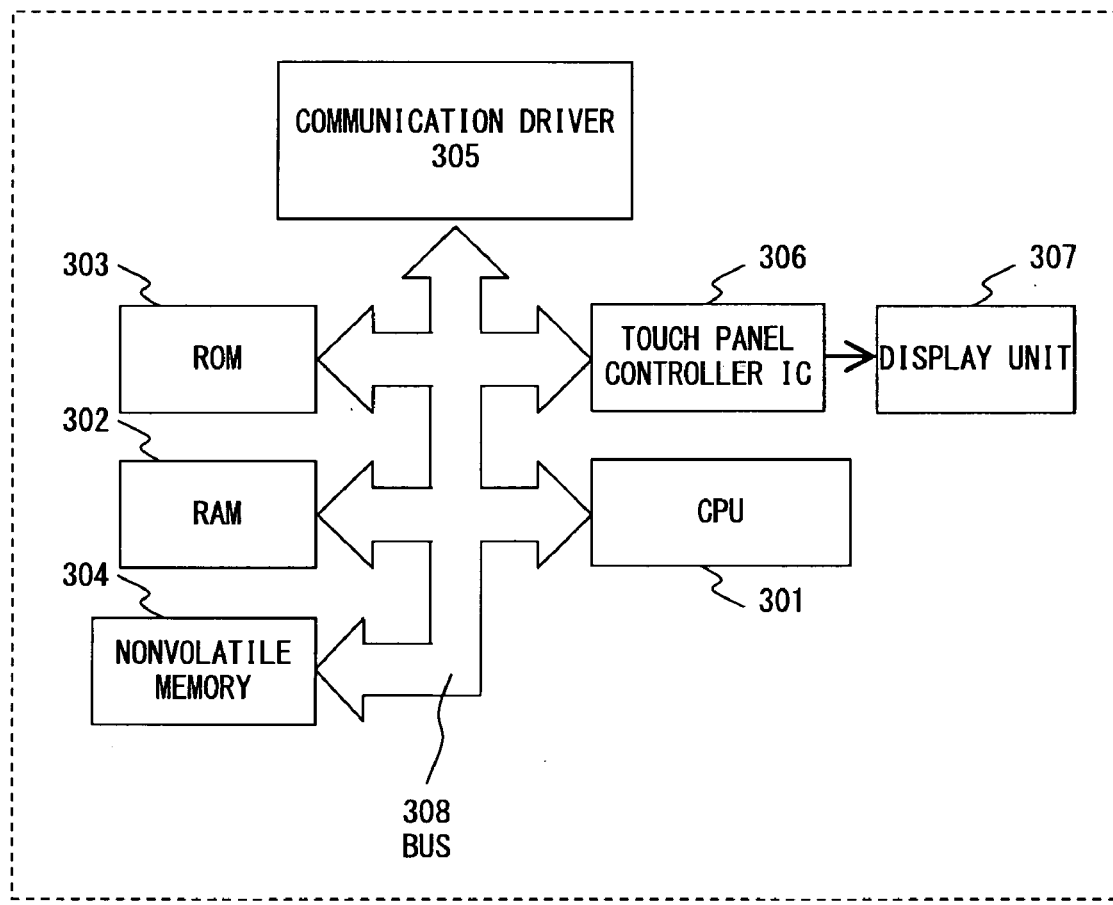
FIG. 3 shows an internal configuration of a controller in the microscope device shown in FIG. 1.

FIG. 3 is described here. This figure shows an internal configuration of the controller 13 shown in FIG. 1.

As shown in FIG. 3, the controller 13 is configured by comprising a CPU 301, a RAM 302, a ROM 303, a nonvolatile memory 304, a communication driver 305, and a display unit 307 connected to a touch panel controller 306. Various types of data can be mutually exchanged among these constituent elements via a bus 308 under the control of the CPU 301.

The CPU (Central Processing Unit) 301 controls the operations of the entire controller 13.

The RAM 302 is a memory used as a working storage area when the CPU 301 executes a control program, and intended to temporarily store various types of data.

In the ROM 303, the control program that the CPU 301 executes to control the operations of the controller 13 is prestored. Also the above described application software for controlling the microscope device is part of this control program.

In the nonvolatile memory 304, information about the on-screen position and shape of an operation button display (a display such as an icon button display, etc. used to obtain an instruction to each configuration unit), which is included in an operation screen displayed on the display unit 307, is presorted.

The communication driver 305 manages a data communication (such as a serial communication) made with the controlling unit 10 of the microscope main body 6, receives microscope information, etc. transmitted from the controlling unit 10, or transmits to the controlling unit 10 control information for controlling the operation of each configuration unit comprised by the microscope main body 6. A control signal output from the communication driver 305 is input to the touch panel controller IC 306.

Upon receipt of the microscope information transmitted from the controlling unit 10 of the microscope main body 6 via the communication driver 305, the touch panel controller IC 306 causes the display unit 307 to display the operating units of configuration units connected to the microscope main body 6 based on the data of the operating units stored in the nonvolatile memory 304.

The display unit 307 is configured with a touch panel display, and functions not only as a display device but also as an operation instrument for an input operation. The CPU 301 reads the data of the operating units, which is stored in the nonvolatile memory 304, based on the microscope information transmitted from the controlling unit 10 of the microscope main body 6. Then, the CPU 301 causes the display unit 307 to display an operation screen in which the operating units of the configuration units connected to the microscope main body 6 are included according to the positions and the shapes indicated by the data.

Figure 4B:
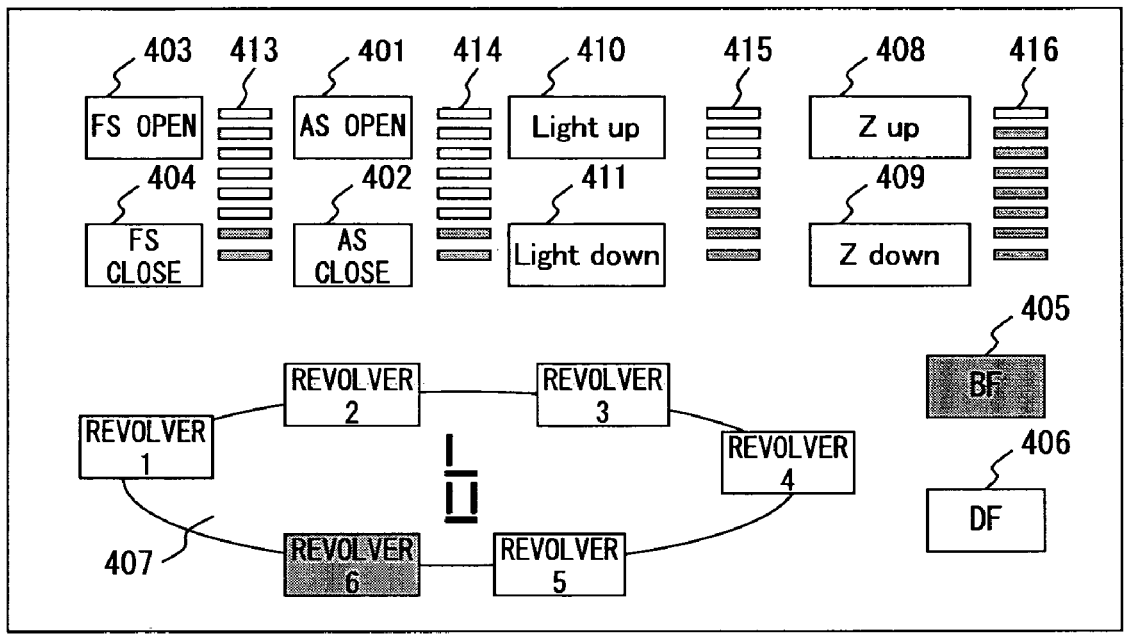
FIG. 4B shows a second example of the operation screen according to the first preferred embodiment.

Examples of the operation screen, which is displayed on the display unit 307 of the controller 13, according to this preferred embodiment are shown in FIGS. 4A and 4B. Both of these operation screens include button displays equivalent to the operating units of the aperture stop unit 104, the field stop unit 105, the half mirror unit 106, the electric revolver 4, the focusing unit 5, and the light source 101 as the operating units of the configuration units.

An AS (Aperture Stop) open button 401 and an AS close button 402 are button displays for the aperture stop unit 104. The aperture stop driving motor M3 for opening/closing the blade diaphragm 104a of the aperture stop unit 104 is being driven while an operation of the touch panel, which is performed for these button displays, continues. Its driving is aborted when this touch panel operation is stopped.

An FS (Field Stop) open button 403 and an FS close button 404 are button displays for the field stop unit 105. The field stop driving motor M4 for opening/closing the blade diaphragm 105a of the field stop unit 105 is being driven while an operation of the touch panel, which is performed for these button displays, continues. Its driving is aborted when this touch panel operation is stopped.

A brightfield (BF) half mirror switching button 405 and a darkfield (DF) half mirror switching button 406 are button displays for the half mirror unit 106. When an operation of the touch panel for either of these button displays is performed, the half mirror driving motor M5 provided in the half mirror unit 106 is driven, so that either of the brightfield half mirror 106a and the darkfield half mirror 106b, which corresponds to the button display for which the touch panel operation is performed, is inserted in the optical path.

A revolver hole switching button group 407 including 6 buttons, which are arranged in the shape of a ring on the operation screen, is button displays for the electric revolver 4. When a touch panel operation is performed for any of these button displays, the revolver motor M1 provided in the electric revolver 4 is driven, and the objective lens 3, which is mounted in the hole the number of which corresponds to the number assigned to the button display for which the touch panel operation is performed among the objective lenses 3 attached to the electric revolver 4, is inserted in the optical path.

A Z up button 408 and a Z down button 409 are button displays for the focusing unit 5. The focusing unit motor M2 provided in the focusing unit 5 is being driven to move the stage 2 in the Z direction while a touch panel operation for either of these button displays continues. When this touch panel operation is stopped, its driving is aborted and the stage 2 is stopped.

A Light UP button 410 and a Light DOWN button 411 are button displays for the light source 101. The brightness of the light source 101 varies with a change in a voltage applied from the power supply unit 11 to the light source 101 while a touch panel operation for either of these button displays continues. When the touch panel operation is stopped, the brightness of the light source 101 is stopped from varying, and becomes stable.

In addition, a state display unit 412 is included in the first example of the operation screen according to this preferred embodiment shown in FIG. 4A. Information indicating the states of optical members within the configuration units, which are detected by the sensor groups S1 to S6 provided for the configuration units, is displayed as text in the state display unit 412. The state display unit 412 is described below.

The column of an "observation method" indicates the state of the half mirror unit 106. Namely, if "BF" is displayed in this column, it indicates that the brightfield half mirror 106a is inserted in the optical path. Or, if "DF" is displayed in this column, it indicates that the darkfield half mirror 106b is inserted in the optical path.

The column of a "revolver hole" indicates the state of the electric revolver 4. A number (any of 1 to 6) displayed in this column corresponds to a hole number of the electric revolver, and indicates that the objective lens 3, which is mounted in the mounting hole having this hole number, is inserted in the optical path.

The column of "FS" indicates the state of the field stop unit 105. A numerical value (ranges, for example, from 1 to 3113) displayed in this column indicates the current diaphragm amount of the blade diaphragm 105a.

The column of "AS" indicates the state of the aperture stop unit 104. A numerical value (ranges, for example, from 1 to 3113) displayed in this column indicates the current diaphragm amount of the blade diaphragm 104a.

The column of "Light" indicates the state of the light source 101. A numerical value (ranges, for example, from 0 to 12) displayed in this column indicates a voltage applied to the light source 101. Namely, this indicates the brightness of the light source 101.

The column of "Z stage" indicates the state of the focusing unit 5. A numerical value (ranges, for example, from 1000 to 100000) displayed in this column indicates the position of the stage 2 in the Z direction.

In the meantime, in the second example of the operation screen according to this preferred embodiment shown in FIG. 4B, information indicating the states of the optical members within the configuration units is displayed not as text like the first example but as indicators.

A field stop indicator 413 indicates the state of the field stop unit 105, and represents the current diaphragm amount of the blade diaphragm 105a as a display relative to a fully open state.

An aperture stop indicator 414 indicates the state of the aperture stop unit 104, and represents the current diaphragm amount of the blade diaphragm 104a as a display relative to a fully open state.

A light source indicator 415 indicates the state of the light source 101, and represents the current brightness of the light source 101 as a display relative to its maximum brightness.

A Z stage indicator 416 indicates the state of the focusing unit 5, and represents the position of the stage 2 in the Z direction (a height from the lowest position) as a display relative to its highest position.

In the second example shown in FIG. 4B, the state of the half mirror unit 106 is indicated by making either of the colors of the brightfield half mirror switching button 405 and the darkfield half mirror switching button 406 different from the other button displays. Namely, in the second example shown in FIG. 2B, which of the brightfield half mirror 106a and the darkfield half mirror 106b is inserted in the optical path is indicated by this color difference.

Additionally, in the second example shown in FIG. 4B, the state of the electric revolver 4 is indicated by making any of the colors of the buttons of the revolver hole switching button group 407 different from the other button displays. Namely, in the second example shown in FIG. 4B, the number of the mounting hole of the electric revolver 4, in which the objective lens 3 inserted in the optical path is mounted, is indicated by this color difference. Alternatively, the number of the mounting hole, in which the objective lens 3 inserted in the optical path is mounted, may be displayed with segments like a hole number display 417.

The controller 13 is configured as described above. The controller 13 receives microscope information transmitted from the microscope main body 6, and transmits control information for controlling the operations of the configuration units comprised by the microscope main body 6. The controlling unit 10 that receives the control information transmitted from the controller 13 controls the operations of the configuration units based on this control information.

The controller 13 can be also configured by using a computer having a typical configuration, namely, a computer comprising an MPU (Micro Processing Unit) that controls the operations of the entire computer system by executing a control program, a main memory that the MPU uses as a working memory depending on need, a storage device such as a hard disk device, etc. for storing various types of programs, control data, etc., an input device such as a mouse device, a keyboard device, etc., which obtains an instruction from an operator, a display device for displaying various types of information and images, and an interface unit for managing the exchanges of various types of data with the microscope main body 6. In this case, a touch panel display may be used as the display device equivalent to the display unit 307. Alternatively, for example, the display device may be used to display the operation screen, and an operator operates input means such as a mouse device, a jog controller, etc., so that an operation performed for the operation screen may be obtained.

FIG. 5 is described next. This is a flowchart showing the contents of an operation screen display process according to this preferred embodiment. This operation screen display process is a process for causing the display unit 307 of the controller 13 to display the operating units of the configuration units, and information indicating the states of the configuration units. This process is executed by the controlling unit 10 and the controller 13.

The CPUs 201 and 301 individually execute the control programs respectively stored in the ROMs 203 and 303, whereby the operation screen display process is executed.

Initially, in S101, the application software of the controller 13 is invoked, and the controller 13 executes a process for transmitting a REMOTE command to the controlling unit 10. Upon receipt of this command, the controlling unit 10 executes a process for causing the outputs of the sensor groups S1 to S6 to be obtained by controlling the driving control circuits 206 to 210 of the aperture stop unit 104, the field stop unit 105, the half mirror unit 106, the electric revolver 4 and the focusing unit 5, and the lamp reference voltage adjustment circuit 211.

In S102, the outputs of the aperture stop sensor group S3 of the aperture stop unit 104 are transmitted from the controlling unit 10 to the controller 13 via the communication drivers 212 and 305, and the controller 13 executes a process for determining based on the output of the aperture stop connection sensor among the sensor group whether or not the aperture stop unit 104 is connected. Here, if the aperture stop unit 104 is determined to be connected (if the determination result is "YES"), the process goes to S103. If the aperture stop unit 104 is determined not to be connected (if the determination result is "NO"), the process goes to S105.

In S103, the controller 13 executes a process for reading the data of the positions and the shapes of the AS open button 401 and the AS close button 402, which are the operating instruments for the aperture stop unit 104, from the nonvolatile memory 304, and for causing the display unit 307 to display on its operation screen the AS open button 401 and the AS close button 402 based on this data.

In S104, the controller 13 executes a process for causing the display unit 307 to display on its operation screen information about the current diaphragm amount of the blade diaphragm 104a based on the output of the aperture stop hole diameter sensor among the aperture stop sensor group S3.

In S105, the outputs of the field stop sensor group S4 of the field stop unit 105 are transmitted from the controlling unit 10 to the controller 13 via the communication drivers 212 and 305, and the controller 13 executes a process for determining based on the output of the field stop connection sensor among the sensor group whether or not the field stop unit 105 is connected. Here, if the field stop unit 105 is determined to be connected (if the determination result is "YES"), the process goes to S106. Or, if the field stop unit 105 is determined not to be connected (if the determination result is "NO"), the process goes to S108.

In S106, the controller 13 executes a process for reading the data of the positions and the shapes of the FS open button 403 and the FS close button 404, which are the operating instruments for the field stop unit 105, from the nonvolatile memory 304, and for causing the display unit 307 to display on its operation screen the FS open button 403 and the FS close button 404 based on this data.

In S107, the controller 13 executes a process for causing the display unit 307 to display on its operation screen information about the current diaphragm amount of the blade diaphragm 105a based on the output of the field stop hole diameter sensor among the field stop sensor group S4.

In S108, the outputs of the half mirror sensor group S5 of the half mirror unit 106 are transmitted from the controlling unit 10 to the controller 13 via the communication drivers 212 and 305, and the controller 13 executes a process for determining based on the output of the half mirror unit connection sensor among the sensor group whether or not the half mirror unit 106 is connected. Here, if the half mirror unit 106 is determined to be connected (if the determination result is "YES"), the process goes to S109. Or, if the half mirror unit 106 is determined not to be connected (if the determination result is "NO"), the process goes to S111.

In S109, the controller 13 executes a process for reading the data of the positions and the shapes of the brightfield half mirror switching button 405 and the darkfield half mirror switching button 406, which are the operating units of the half mirror unit 106, from the nonvolatile memory 304. Then, the controller 13 executes a process for causing the display unit 307 to display on its operation screen the brightfield half mirror switching button 405 and the darkfield half mirror switching button 406 based on this data.

In S110, the controller 13 executes a process for causing the display unit 307 to display on its operation screen information indicating which of the brightfield half mirror 106a and the darkfield half mirror 106b is inserted in the optical path based on the output of the move completion sensor of the half mirror sensor group S5.

In S111, the outputs of the revolver sensor group S1 of the electric revolver 4 are transmitted from the controlling unit 10 to the controller 13 via the communication drivers 212 and 305, and the controller 13 executes a process for determining based on the output of the revolver connection sensor among the sensor group whether or not the electric revolver 4 is connected. Here, if the electric revolver 4 is determined to be connected (if the determination result is "YES"), the process goes to S112. Or, if the electric revolver 4 is determined not to be connected (if the determination result is "NO"), the process goes to S114.

In S112, the controller 13 executes a process for reading the data of the positions and the shapes of the revolver hole switching button group 407, which is the operating instruments for the electric revolver 4, from the nonvolatile memory 304, and for causing the display unit 307 to display on its operation screen the revolver hole switching button group 407 based on this data.

In S113, the controller 13 executes a process for causing the display unit 307 to display on its operation screen information indicating the hole number assigned to the objective lens mounting hole, in which the objective lens 3 inserted in the optical path is mounted, based on the output of the hole number sensor among the revolver sensor group S1.

In S114, the output of the optical lamp connection sensor S6 of the power supply unit 11 is transmitted from the controlling unit 10 to the controller 13 via the communication drivers 212 and 305, and the controller 13 executes a process for determining based on the output of the optical lamp connection sensor S6 whether or not the power supply unit 11 and the light source 101 are connected. Here, if the power supply unit 11 and the light source 101 are determined to be connected (if the determination result is "YES"), the process goes to S115. Or, if the power supply unit 11 and the light source 101 are determined not to be connected (if the determination result is "NO"), the process goes to S117.

In S115, the controller 13 initially executes a process for reading the data of the positions and the and the shapes of the Light UP button 410 and the Light DOWN button 411, which are the operating units of the light source 101, from the nonvolatile memory 304. Then, the controller 13 executes a process for causing the display unit 307 to display on its operation screen the Light UP button 410 and the Light DOWN button 411 based on this data.

In S116, the controller 13 executes a process for causing the display unit 307 to display on its operation screen information about a voltage, which is applied to the light source 101 and determined according to the lamp set voltage output from the lamp reference voltage adjustment circuit 211.

In S117, the controlling unit 10 initially executes a process for transmitting the outputs of the focusing unit sensor group S2 of the focusing unit 5 from the controlling unit 10 to the controller 13 via the communication drivers 212 and 305. Then, the controller 13 executes a process for determining based on the output of the focusing unit connection sensor among the sensor group whether or not the focusing unit 5 is connected. Here, if the focusing unit 5 is determined to be connected (if the determination result is "YES"), the process goes to S118. Or, if the focusing unit is determined not to be connected (if the determination result is "NO"), the operation screen display process is terminated.

In S118, the controller 13 initially executes a process for reading the data of the positions and the and the shapes of the Z up button 408 and the Z down button 409, which are the operating units of the focusing unit 5, from the nonvolatile memory 304. Then, the controller 13 executes a process for causing the display unit 307 to display on its operation screen the Z up button 408 and the Z down button 409 based on this data.

In S119, the controller 13 executes a process for causing the display unit 307 to display on its operation screen information indicating the current position of the stage 2 in the Z direction based on the output of the position detection sensor among the focusing unit sensor group S2. Thereafter, the operation screen display process is terminated.

The process described up to this point is the operation screen display process. This process is executed, whereby the operation screen shown in FIG. 4A or 4B is displayed on the display unit 307 of the controller 13. Namely, the operation screen, on which the operation button displays used to obtain the instructions for the operations of the configuration units are arranged based on microscope information transmitted from the controlling unit 10, is displayed on the display unit 307.

An operator issues an instruction for the operation of each configuration unit comprised by the microscope main body 6 with the use of this operation screen by performing a touch panel operation for the display unit 307. The display unit 307 obtains the position on the operation screen, in which the touch panel operation is performed. Then, the display unit 307 handles this touch panel operation as an instruction for the operation of the configuration unit indicated by the microscope information, which is made to correspond to the operation button display arranged in the obtained position based on correspondence information stored in the nonvolatile memory 304, and notifies the CPU 301 of this instruction. The CPU 301 causes the communication driver 305 to transmit the control information, which is made to correspond to this instruction, to the controlling unit 10 by controlling the communication driver 305.

As described above, according to this preferred embodiment, the connection states of configuration units provided in the microscope main body 6 are detected when the controller 13 is connected to the microscope main body 6. Then, the initial settings of the operation screen displayed on the controller 13 are automatically made according to the connection states of the configuration units. Accordingly, information displayed on the operation screen of the controller 13 becomes a required minimum, thereby preventing an operator of the microscope device shown in FIG. 1 from erroneously recognizing connected units. As a result, observation efficiency is increased.

Second Preferred Embodiment

In this preferred embodiment, an operation screen displayed on the controller 13 varies by the type of a connected microscope device.

The configuration of the microscope device according to this preferred embodiment is similar to that shown in FIG. 1. Also the internal configuration of the controlling unit 10 in this microscope device is similar to that of the first example shown in FIG. 2. Also the internal configuration of the controller 13 is similar to that shown in FIG. 3.

Figure 6B:
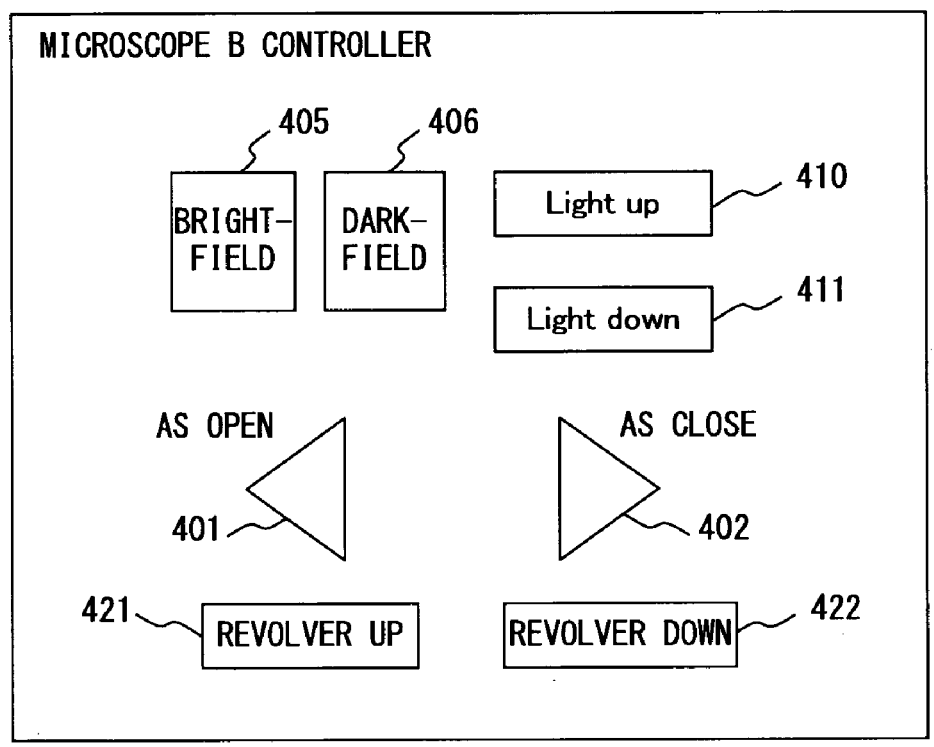
FIG. 6B shows a second example of the operation screen according to the second preferred embodiment.

FIGS. 6A and 6B are described here. These figures show examples of the operation screen according to this preferred embodiment, which is displayed on the display unit 307 of the controller 13. Here, a first example of the operation screen shown in FIG. 6A is a screen displayed when the controller 13 is connected to a microscope device the type name of which is a "microscope A". In contrast, a second example of the operation screen shown in FIG. 6B is a screen displayed when the controller 13 is connected to a microscope device the type name of which is a "microscope B". As described above, the type of a connected microscope device is detected, and the operating unit of a configuration unit that is not comprised by the device is not displayed on the controller 13, in this preferred embodiment. In the meantime, an operating unit of a configuration unit, the use frequency of which is high, among configuration units comprised by the device is displayed on the controller 13 with its shape highlighted in comparison with the operating units of the other configuration units.

For example, the "microscope A" is suitable for making an observation by frequently switching among the magnification factors of the objective lenses 3. Accordingly, the revolver hole switching button group 407, which is the button displays for the electric revolver 4 for switching among the objective lenses 3, occupies a wide area and is arranged in the shape of a ring on the screen of FIG. 6A, which is the operation screen for the "microscope A".

In the meantime, the field stop unit 105 and the focusing unit 5 are not comprised by the "microscope B". Therefore, the screen of FIG. 6B, which is the operation screen for the "microscope B", does not include the FS open button 403 and the FS close button 404, which are the button displays for the field stop unit 105, and the Z up button 408 and the Z down button 409, which are the button displays for the focusing unit 5, compared with the screen shown in FIG. 6A. Due to the specifications of the "microscope B", an operation for opening/closing the blade diaphragm 104a for the aperture stop unit 104 is expected to be frequently used. Accordingly, the AS open button 401 and the AS close button 402, which are the button displays for the aperture stop unit 104, occupy a wider area on the operation screen than that on the operation screen shown in FIG. 6A, and are arranged. Also the shapes of these button displays are made larger than those on the operation screen of FIG. 6A.

In FIG. 6B, a revolver forward revolution button 421 and a revolver backward revolution button 422 are provided as button displays for the electric revolver 4 as a replacement for the revolver hole switching button group 407. Each time a touch panel operation is performed for either of these button displays, the revolver motor M1 provided in the electric revolver 4 is driven to once revolve the electric revolver 4 in the forward direction (the direction of increasing a hole number) or in the backward direction (the direction of decreasing the hole number). The objective lens 3 inserted in the optical path is switched in this way.

On the operation screens shown in FIGS. 6A and 6B, the information indicating the states of optical members within the configuration units may be displayed as text or indicators in a similar manner as in the examples of the operation screen in the first preferred embodiment shown in FIGS. 4A and 4B.

FIG. 7 is described next. This is a flowchart showing the contents of an operation screen display process according to this preferred embodiment. This operation screen display process is a process for causing the display unit 307 of the controller 13 to display an operation screen according to the type of a connected microscope device, and is executed by the controlling unit 10 and the controller 13.

The CPUs 201 and 301 individually execute the control programs respectively stored in the ROMs 203 and 303, whereby this operation screen display process is implemented.

Initially, in S201, the application software of the controller 13 is invoked, and the controller 13 executes a process for transmitting a REMOTE command to the controlling unit 10. Upon receipt of this command, the controlling unit 10 executes a process for causing the outputs of the sensor groups S1 to S6 to be obtained by controlling the driving control circuits 206 to 210 of the aperture stop unit 104, the field stop unit 105, the half mirror unit 106, the electric revolver 4 and the focusing mechanism unit 5, and the lamp reference adjustment circuit 211.

In S202, the controlling unit 10 executes a process for reading the type identification information of the microscope device from the nonvolatile memory 204 and for transmitting the read information via the communication drivers 212 and 305, and the controller 13 executes a process for determining based on the type identification information whether or not the microscope device to which the controller 13 is connected is the "microscope A". Here, if the microscope device to which the controller 13 is connected is determined to be the "microscope A" (if the determination result is "YES"), the process goes to S203. Or, if the microscope device to which the controller 13 is connected is determined not to be the "microscope A" (if the determination result is "NO"), the process goes to S204.

In S203, the controlling unit 10 initially executes a process for transmitting the outputs of the sensor groups S1 to S6 via the communication drivers 212 and 305. Then, the controller 13 that receives these outputs executes a process for reading data stored for the operation screen for the "microscope A" from the nonvolatile memory 302 according to the outputs. Then, the controller 13 executes a process for causing the display unit 307 to display the operation screen shown in FIG. 6A by arranging the button displays, the positions and the shapes of which are indicated by the read data, on the operation screen. Thereafter, the operation screen display process is terminated.

In S204, the controlling unit 10 executes a process for reading the type identification information of the microscope device from the nonvolatile memory 204 and for transmitting the read information via the communication drivers 212 and 305, and the controller 13 executes a process for determining based on the type identification information whether or not the microscope device to which the controller 13 is connected is the "microscope B". Here, if the microscope device to which the controller 13 is connected is determined to be the "microscope B" (if the determination result is "YES"), the process goes to S205. Or, if the microscope device to which the controller 13 is connected is determined not to be the "microscope B" (if the determination result is "NO"), the process goes to S206.

In S205, the controlling unit 10 initially executes a process for transmitting the outputs of the sensor groups S1 to S6 via the communication drivers 212 and 305. Then, the controller 13 that receives the outputs executes a process for reading data stored for the operation screen for the "microscope B" from the nonvolatile memory 304 according to the outputs. Then, the controller 13 executes a process for causing the display unit 307 to display the operation screen shown in FIG. 6B by arranging the button displays, the positions and the shapes of which are indicated by the read data, on the operation screen. Thereafter, the operation screen display process is terminated.

In S206, the controlling unit 10 initially executes a process for transmitting the outputs of the sensor groups S1 to S6 via the communication drivers 212 and 305. Then, the controller 13 that receives these outputs executes a process for reading data for a general-purpose operation screen (not an operation screen dedicated to the "microscope A" or the "microscope B", but, for example, the operation screen shown in FIG. 4A or 4B) from the nonvolatile memory 304 according to the outputs. Then, the controller 13 executes a process for causing the display unit 307 to display the operation screen on which button displays, the positions and the shapes of which are indicated by the read data, are arranged. Specific contents of the process of S206 are the processes from S102 to S119 in the first example of the operation screen display process shown in FIG. 5.

Upon termination of the process of S206, the operation screen display process is terminated.

The process described up to this point is executed, whereby an operation screen that varies by the type of a connected microscope is displayed on the display unit 307 of the controller 13.

As described above, according to this preferred embodiment, an operation screen displayed on the controller 13 is switched according to the type of a connected microscope device when the controller 13 is connected, leading to improvements in the operability of the controller 13 for an operator of the microscope.

Third Preferred Embodiment

In this preferred embodiment, the operating unit of the same configuration unit is prevented from being redundant when a hand switch, which is operated to issue instructions to configuration units of the microscope device, is used simultaneously with the controller 13 in the microscope device.

Figure 8:
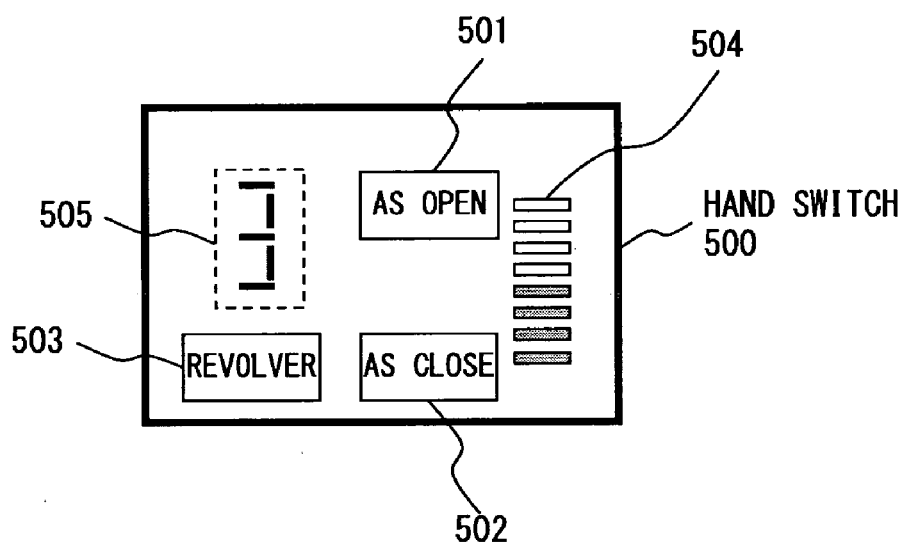
FIG. 8 shows a configuration of an upper face of a hand switch.

FIG. 8 is described here. This figure shows the configuration of the upper face of the hand switch.

On the hand switch 500 shown in FIG. 8, both an AS open button 501 and an AS close button 502 are buttons for the aperture stop unit 104. The aperture stop driving motor M3 for opening/closing the blade diaphragm 104a of the aperture stop unit 104 is being driven while a press operation for these buttons continues. Its driving is aborted when the press operation is stopped.

A revolver switching button 503 is a button for the electric revolver 4. Each time a press operation is performed for this button, the revolver motor M1 provided in the electric revolver 4 is driven to once revolve the electric revolver 4 in the forward direction (the direction of increasing a hole number), so that an objective lens 3 inserted in the optical path is switched.

An aperture stop indicator 504 indicates the state of the aperture stop unit 104, and represents the current diaphragm amount of the blade diaphragm 104a as a display relative to a fully open state.

A hole number display 505 indicates the state of the electric revolver 4, and displays the numeral of the number of the mounting hole, in which an objective lens 3 inserted in the optical path is mounted, with segments.

In this preferred embodiment, the aperture stop indicator 504 and the hole number display 505 are configured by arranging LEDs (Light Emitting Diodes).

The hand switch 500 in this preferred embodiment has the above described configuration, and obtains an instruction for the operation of a configuration unit independently of the display unit 307 that is instruction obtaining means comprised by the controller 13. This hand switch 500 is freely attachable/detachable to/from the microscope main body 6.

The configuration of the microscope device according to this preferred embodiment is similar to that shown in FIG. 1. Also the internal configuration of the controller 13 is similar to that shown in FIG. 3. Additionally, it is assumed that the operation screen displayed on the display unit 307 of the controller 13 when the hand switch 500 is not connected to the microscope device is similar to that in the first preferred embodiment shown in FIG. 4A or 4B.

FIG. 9 is described here. This figure shows a second example of the internal configuration of the controlling unit 10.

The configuration of the controlling unit 10 shown in FIG. 9 is implemented by adding, to the first configuration shown in FIG. 2, a hand switch I/O 510 for managing the exchanges of various types of data between the hand switch 500 and the constituent elements of the controlling unit 10. The hand switch I/O 510 detects whether or not the hand switch 500 is connected, detects whether or not a press operation is performed for the AS open button 501, the AS close button 502, and the revolver switching button 503, and controls the lighting-up of the aperture stop indicator 504 and the hole number display 505.

Figure 10:
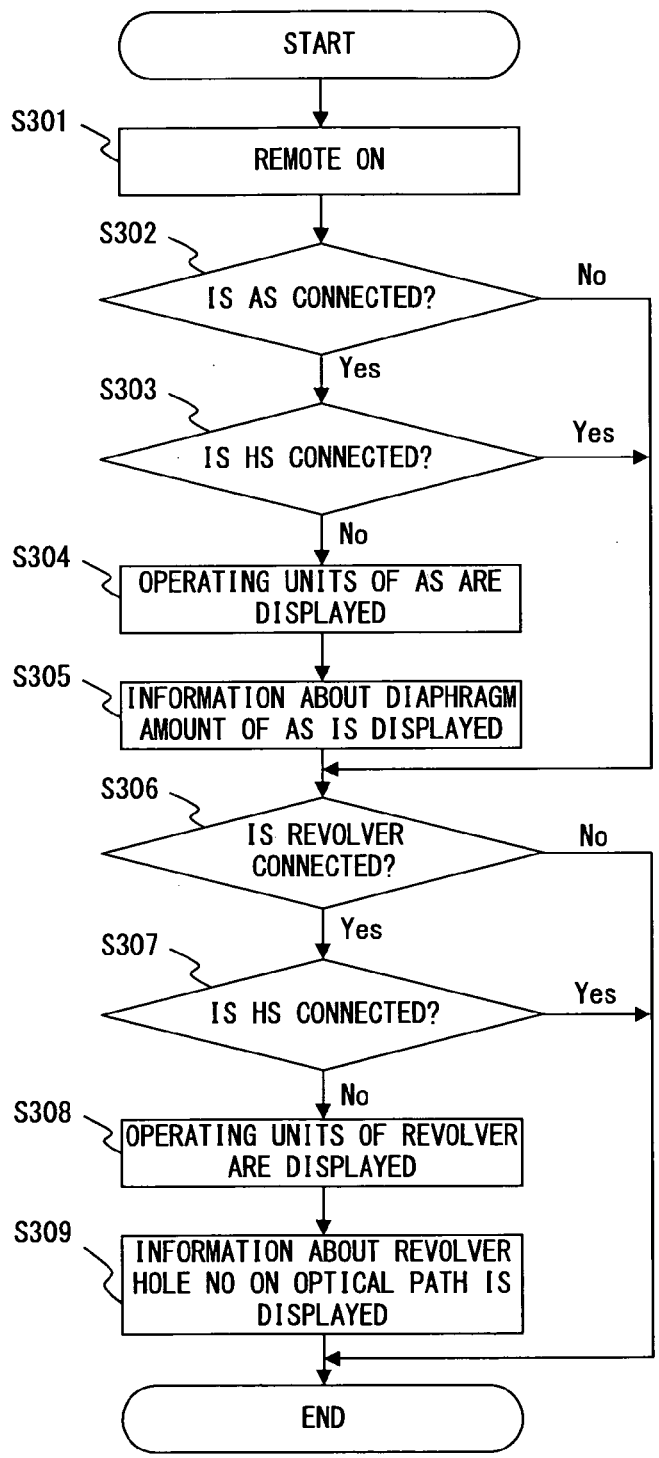
FIG. 10 is a flowchart showing an operation screen display process according to a third preferred embodiment.

FIG. 10 is described next. This figure is a flowchart showing the contents of an operation screen display process according to this preferred embodiment. This operation screen display process is a process for causing the display unit 307 of the controller 13 to display an operating unit, which is not comprised by the hand switch, of a configuration unit among the configuration units, and to display information indicating the state of such a configuration unit. This operation screen display process is executed by the controlling unit 10 and the controller 13.

The CPUs 201 and 301 individually execute the control programs respectively stored in the ROMs 203 and 303, whereby this operation screen display process is implemented.

Initially, in S301, the application software of the controller 13 is invoked, and the controller 13 executes a process for transmitting a REMOTE command to the controlling unit 10. Upon receipt of this command, the controlling unit 10 executes a process for causing the outputs of the sensor groups S1 to S6 to be obtained by controlling the driving control circuits 206 to 210 of the aperture stop unit 104, the field stop unit 105, the half mirror unit 106, the electric revolver 4 and the focusing mechanism unit 5, and the lamp reference voltage adjustment circuit 211.

In S302, the outputs of the aperture stop sensor group S3 of the aperture stop unit 104 are transmitted from the controlling unit 10 to the controller 13 via the communication drivers 212 and 305, and the controller 13 executes a process for determining based on the output of the aperture stop connection sensor among the sensor group whether or not the aperture stop unit 104 is connected. Here, if the aperture stop unit 104 is determined to be connected (if the determination result is "YES"), the process goes to S303. Or, if the aperture stop unit 104 is determined not to be connected (if the determination result is "NO"), the process goes to S306 without displaying the button displays for the aperture stop unit 104 on the display unit 307.

In S303, the result of detection, which is made by the hand switch I/O 510, of whether or not the hand switch (HS) 500 is connected is transmitted from the controlling unit 10 to the controller 13 via the communication drivers 212 and 305. Then, the controller 13 executes a process for determining based on the detection result whether or not the hand switch 500 is connected to the microscope main body 6. Here, if the hand switch 500 is determined to be connected (if the determination result is "YES"), the process goes to S306 without displaying the button displays for the aperture stop unit 104 on the display unit 307. Or, if the hand switch 500 is determined not to be connected (if the determination result is "NO"), the process goes to S304.

In S304, the controller 13 executes a process for reading the positions and the shapes of the AS open button 401 and the AS close button 402, which are the operating units of the aperture stop unit 104, from the nonvolatile memory 304, and for causing the display unit to display on its operation screen the AS open button 401 and the AS close button 402 based on the read data.

In S305, the controller 13 executes a process for causing the display unit 307 to display on its operation screen information about the current diaphragm amount of the blade diaphragm 104a based on the output of the aperture stop hole diameter sensor among the aperture stop sensor group S3.

In S306, the outputs of the revolver sensor group S1 of the electric revolver 4 are transmitted from the controlling unit 10 to the controller 13 via the communication drivers 212 and 305, and the controller 13 executes a process for determining based on the output of the revolver connection sensor among the sensor group whether or not the electric revolver 4 is connected. Here, if the electric revolver 4 is determined to be connected (if the determination result is "YES"), the process goes to S307. Or, if the electric revolver 4 is determined not to be connected (if the determination result is "NO"), this operation screen display process is terminated without displaying the button displays for the electric revolver 4 on the display unit 307.

In S307, the result of detection, which is made by the hand switch I/O 510, of whether or not the hand switch 500 is connected is transmitted from the controlling unit 10 to the controller 13 via the communication drivers 212 and 305, and the controller 13 executes a process for determining based on the detection result whether or not the hand switch 500 is connected to the microscope main body 6. Here, if the hand switch 500 is determined to be connected (if the determination result is "YES"), the operation screen display process is terminated without displaying the button displays for the electric revolver 4 on the display unit 307. Or, if the hand switch 500 is determined not to be connected (if the determination result is "NO"), the process goes to S308.

In S308, the controller 13 executes a process for reading the data of the positions and the shapes of the revolver hole switching button group 407 that is the operating unit for the electric revolver 4, and for causing the display unit 307 to display on its operation screen the revolver hole switching button group 407 based on this data.

In S309, the controller 13 executes a process for causing the display unit 307 to display on its operation screen information indicating the number of the mounting hole, in which the objective lens 3 inserted in the optical path is mounted, based on the output of the hole number sensor among the revolver sensor group S1. Thereafter, the operation screen display process is terminated.

The process described up to this point is executed, whereby an operation screen displayed on the display unit 307 of the controller 13 is changed, and only a button display, which is not included in the hand switch 500, among button displays used to issue instructions to the configuration units of the microscope device is displayed when the hand switch 500 is connected to the microscope main body 6.

As described above, according to this preferred embodiment, operating units of configuration units comprised by the microscope device are provided by being shared by the hand switch 500 and the controller 13 so that the same operating unit is prevented from being redundant in the hand switch 500 and the controller 13. Accordingly, even if the number of entries to be displayed on the operation screen grows with an increase in the number of configuration units comprised by the microscope device, the operation screen is organized by transferring some of operation functions from the controller 13 to the hand switch 500. Therefore, an operator is prevented from having difficulty in finding a desired operating unit, leading to improvements in the operability of the controller 13.

Note that the configuration units comprised by the microscope device are not limited to those cited in the above described preferred embodiments. For example, the following units can be listed as configuration units comprised by the microscope device in addition to those in the preferred embodiments.

an aperture stop unit for adjusting the contrast of an observation image a field stop unit for adjusting the view field of an observation image a half mirror unit having optical elements that respectively make a brightfield observation (BF), a darkfield observation (DF), a differential interference observation, a phase contrast observation, and a fluorescent observation by switching a illumination light path from a light source a revolver unit for switching among optical lenses of different magnification factors a light source unit for adjusting the amount of light by adjusting a voltage applied to a halogen lamp an X-Y moving unit for moving a stage on which a sample is placed, or an objective lens in an X-Y direction (a direction orthogonal to an optical axis)

a Z moving unit for driving a focusing unit of a microscope (moving a stage or an objective lens up and down)

an AF unit for automatically adjusting the focus of an observation sample an ND filter unit, in which an ND filter (a neutral density filter) is arranged on a turret, for reducing the amount of illumination light without changing a color temperature, or for dimming light a shutter unit, which is arranged before a light source, for instantaneously blocking illumination light a camera unit for capturing an observation image with a digital camera or a CCD camera Additionally, a CAN (Controller Area Network) may be adopted as communication means for transmitting the output signal of a sensor provided in each configuration unit comprised by the microscope device, or as communication means for transmitting a driving instruction signal to the driving unit of each configuration unit from the controller 13.

Furthermore, in the first preferred embodiment, it is not always required to display on the operation screen of the controller 13 the states of configuration units, which are detected by the sensor groups S1 to S6 of the configuration units. Only button displays that are operating units of configuration units may be displayed on the display unit 307.

Still further, in the first preferred embodiment, button displays, which are operating units displayed on the operation screen of the controller 13, may have different shapes or colors by function.

Still further, in the first and the second preferred embodiments, information about the position and the shape of an operation button display, which is used to obtain an instruction for the operation of each configuration unit, on the display screen of the display unit 307 is prestored in the nonvolatile memory 304. Alternatively, the following operations may be performed as follows.

Namely, the information is initially prestored in the nonvolatile memory 204 of the controlling unit 10. The controlling unit 10 obtains the information from the nonvolatile memory 204, and transmits the information to the controller 13 by including the information in the above described microscope information. Then, the CPU 301 of the controller 13 extracts the information from the microscope information transmitted from the controlling unit 10 of the microscope main body 6, generates an operation screen including the operation button display according to the position and the shape based on the extracted information, and causes the display unit 307 to display the operation screen.

Still further, in the third preferred embodiment, an operating unit of the same configuration unit is prevented from being redundant in the hand switch 500 and the controller 13. Information indicating the state of a configuration unit the operating unit of which is provided in the hand switch 500 may be displayed on the operation screen of the controller 13. To implement this, the operation screen display process, the contents of which are represented by the flowchart shown in FIG. 11, may be executed by the controlling unit 10 and the controller 13.

Figure 11:
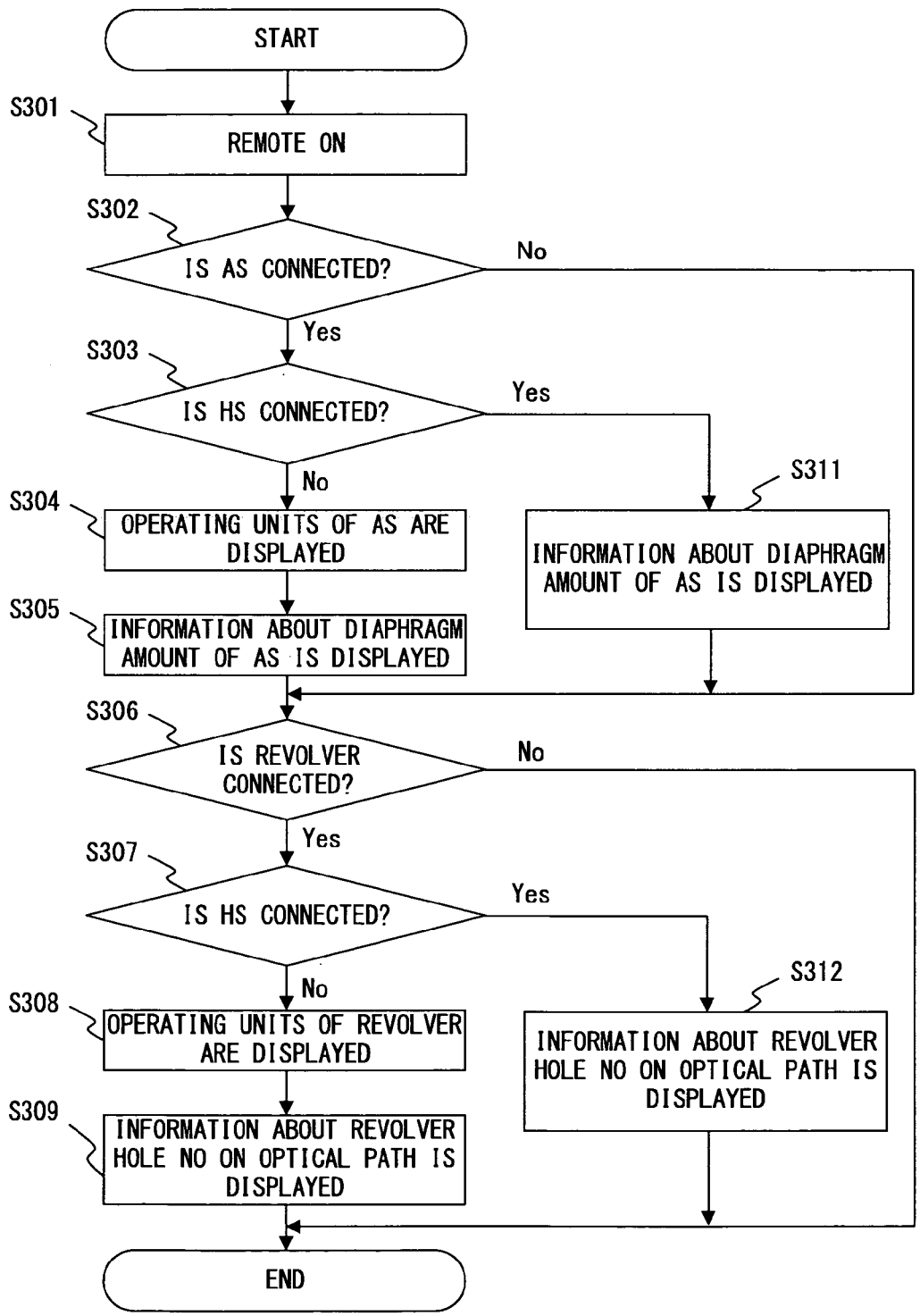
FIG. 11 is a flowchart showing a modification example of the operation screen display process according to the third preferred embodiment.

The process of FIG. 11 is implemented by adding the processes of S311 and S312 to the operation screen display process shown in FIG. 9. The processes of S311 and S312 are executed when the controller 13 determines in the determination processes of S303 and S307 that the hand switch 500 is not connected.

In S311, the controller 13 executes a process for causing the display unit 307 to display on its operation screen information about the current diaphragm amount of the blade diaphragm 104a based on the output of the aperture stop hole diameter sensor among the aperture stop sensor group S3. Thereafter, the process goes to S306.

Additionally, in S312, the controller 13 executes a process for causing the display unit 307 to display on its operation screen information indicating the number of the objective lens mounting hole, in which an objective lens 3 inserted in the optical path is mounted, based on the output of the hole number sensor among the revolver sensor group S1. Thereafter, the operation screen display process is terminated.

The above described process of FIG. 11 is executed, whereby information indicating the state of a configuration unit the operating unit of which is provided in the hand switch 500 is displayed on the operation screen of the controller 13.

Furthermore, in the third preferred embodiment, both the hand switch 500 and the controller 13 are connected to the microscope main body 6. Alternatively, a hand switch I/O may be provided in the controller 13, and the hand switch 500 may be connected to the controller 13. Moreover, in the third preferred embodiment, an operation screen displayed on the display unit 307 of the controller 13 is changed upon detecting that the hand switch 500 is connected to the microscope main body 6. Here, if the hand switch 500 is configured to be freely attachable/detachable to/from the controller 13, the operation screen displayed on the display unit 307 of the controller 13 may be changed upon detecting that the hand switch 500 is connected to the controller 13. Namely, the CPU 301 may cause the display unit 307 to display an operation screen, on which operation button displays only for configuration units other than a configuration unit with which the controller 13 obtains an instruction for an operation among configuration units comprised by the microscope device are arranged, upon detecting that the hand switch 500 is connected to the controller 13.

The present invention is not limited to the above described preferred embodiments, and various improvements and modifications can be made within a scope that does not depart from the gist of the present invention.

What is claimed is:

1. A microscope device which obtains an image of a sample to be observed, comprising:
   a microscope information obtaining unit which obtains microscope information, which is information about each configuration unit which configures the microscope device;
   a controller which receives the microscope information, and which transmits control information for controlling an operation of the configuration unit;
   a main body side transmitting/receiving unit which transmits the microscope information to the controller, and which receives the control information from the controller; and
   a main body side controlling unit which controls the operation of the configuration unit based on the control information received by the main body side transmitting/receiving unit,
   wherein the controller comprises:
      a controller side transmitting/receiving unit which receives the microscope information transmitted from the main body side transmitting/receiving unit, and which transmits the control information to the main body side transmitting/receiving unit,
      a displaying unit which displays an operation screen on which an operation button display used to obtain an instruction for the operation of the configuration unit is arranged based on the microscope information received by the controller side transmitting/receiving unit,
      an instruction obtaining unit which obtains the instruction by using the operation button display, and
      a controller side controlling unit which controls the controller side transmitting/receiving unit to transmit the control information, which corresponds to the instruction obtained by the instruction obtaining unit.

2. The microscope device according to claim 1, wherein the microscope information includes configuration unit identification information for identifying the configuration unit.

3. The microscope device according to claim 2, wherein:
   the controller further comprises a storing unit which stores information, which indicates shapes of operation button displays, for each configuration unit; and
   the displaying unit displays an operation screen on which a shape of an operation button display for a configuration unit identified with the configuration unit identification information included in the microscope information received by the controller side transmitting/receiving unit is selected and arranged from among the shapes of the operation button displays indicated by the information stored in the storing unit.

4. The microscope device according to claim 1, wherein:
   the microscope information includes at least information, which indicates a shape of the operation button display used to obtain the instruction for the operation of the configuration unit;
   the microscope information obtaining unit obtains the microscope information about the configuration unit configuring the microscope device from a storing unit for storing microscope information about each configuration unit; and
   the displaying unit displays an operation screen on which the operation button display having the shape indicated by the information included in the microscope information received by the controller side transmitting/receiving unit is arranged.

5. The microscope device according to claim 1, wherein the displaying unit displays an operation screen on which an operation button display only for a configuration unit among the configuration units of the microscope device, is arranged based on the microscope information received by the controller side transmitting/receiving unit.

6. The microscope device according to claim 1, wherein the microscope information includes type identification information for identifying a type of the microscope device.

7. The microscope device according to claim 6, wherein:
the controller further comprises a storing unit which stores information that indicates a correspondence between the type identification information and a configuration unit configuring the microscope device the type of which is identified with the type identification information; and
an operation button display only for a configuration unit, whose correspondence with the type identification information included in the microscope information received by the controller side transmitting/receiving unit is indicated by the information stored in the storing unit, is arranged on the operation screen.

8. The microscope device according to claim 1, further comprising:
a sub-instruction-obtaining unit, which is freely attachable/detachable to/from the microscope device, and which obtains the instruction for the operation of the configuration unit independently of the instruction obtaining unit of the controller; and
a detecting unit which detects whether or not the sub-instruction-obtaining unit is connected,
wherein the main body side transmitting/receiving unit further transmits to the controller detection information indicating a result of detection made by the detecting unit, the controller side transmitting/receiving unit further receives the detection information transmitted from the main body side transmitting/receiving unit, and the displaying unit changes the operation screen according to the detection information received by the controller side transmitting/receiving unit, and displays the operation screen.

9. The microscope device according to claim 8, wherein the displaying unit display an operation screen on which the operation button display only for a configuration unit other than a configuration unit for which the sub-instruction-obtaining unit obtains an instruction for an operation, among the configuration units of the microscope device, is arranged, if the detection information received by the controller side transmitting/receiving unit indicates that the sub-instruction-obtaining unit is detected to be connected.

10. The microscope device according to claim 1, further comprising a sub-instruction-obtaining unit, which is freely attachable/detachable to/from the controller, and which obtains the instruction for the operation of the configuration unit independently of the instruction obtaining unit of the controller, wherein the controller further comprises a detecting unit for detecting whether or not the sub-instruction-obtaining unit is connected, and the displaying unit changes the operation screen according to a result of detection made by the detecting unit, and displays the operation screen.

11. The microscope device according to claim 10, wherein the displaying unit displays an operation screen, on which an operation button display only for a configuration unit other than a configuration unit for which the sub-instruction-obtaining unit obtains an instruction for an operation, among the configuration units of the microscope device, is arranged, if the detecting unit detects that the sub-instruction-obtaining unit is connected.

12. A controller which is included in a microscope device which obtains an image of a sample to be observed, wherein the controller receives microscope information and transmits control information, the microscope information being information about each configuration unit which configures the microscope device, the control information being information for controlling an operation of the configuration unit,
wherein the microscope device comprises:
a microscope information obtaining unit which obtains microscope information,
a main body side transmitting/receiving unit which transmits the microscope information to the controller, and which receives the control information from the controller, and
a main body side controlling unit which controls the operation of the configuration unit based on the control information received by the main body side transmitting/receiving unit,
wherein the controller comprises:
a controller side transmitting/receiving unit which receives the microscope information transmitted from the main body side transmitting/receiving unit, and which transmits the control information to the main body side transmitting/receiving unit,
a displaying unit which displays an operation screen on which an operation button display used to obtain an instruction for the operation of the configuration unit is arranged based on the microscope information received by the controller side transmitting/receiving unit,
an instruction obtaining unit which obtains the instruction by using the operation button display, and
a controller side controlling unit which controls the controller side transmitting/receiving unit to transmit the control information, which corresponds to the instruction obtained by the instruction obtaining unit.

13. A microscope device which obtains an image of a sample to be observed, comprising:
a microscope information obtaining unit which obtains microscope information, which includes configuration unit identification information for identifying each configuration unit which configures the microscope device;
a controller which receives the microscope information, and which transmits control information for controlling an operation of the configuration unit;
a main body side transmitting/receiving unit which transmits the microscope information to the controller, and which receives the control information from the controller; and
a main body side controlling unit which controls the operation of the configuration unit based on the control information received by the main body side transmitting/receiving unit,
wherein the controller comprises:
a controller side transmitting/receiving unit which receives the microscope information transmitted from the main body side transmitting/receiving unit, and which transmits the control information to the main body side transmitting/receiving unit,
a storing unit which stores, for each of the configuration units, shape information indicating a shape of an operation button display used to obtain an instruction for the operation of the configuration unit,
a displaying unit which, when a shape of an operation button display relating to a configuration unit identified by the configuration unit identification information included in the microscope information received by the controller side transmitting/receiving unit is selected from the shape information indicating the shape of the operation button display stored in the storing unit, displays an operation screen on which the selected operation button display is arranged,
an instruction obtaining unit which obtains the instruction by using the operation button display, and
a controller side controlling unit which controls the controller side transmitting/receiving unit to transmit the control information, which corresponds to the instruction obtained by the instruction obtaining unit.

14. A microscope device which obtains an image of a sample to be observed, comprising:
a microscope information obtaining unit which obtains microscope information, which includes information about each configuration unit which configures the microscope device and type identification information for identifying a type of the microscope device;
a controller which receives the microscope information, and which transmits control information for controlling an operation of the configuration unit;
a main body side transmitting/receiving unit which transmits the microscope information to the controller, and which receives the control information from the controller; and
a main body side controlling unit which controls the operation of the configuration unit based on the control information received by the main body side transmitting/receiving unit,
wherein the controller comprises:
a controller side transmitting/receiving unit which receives the microscope information transmitted from the main body side transmitting/receiving unit, and which transmits the control information to the main body side transmitting/receiving unit,
a storing unit which stores, for each of the types, shape information indicating a shape of an operation button display used to obtain an instruction for the operation of the configuration unit,
a displaying unit which, when a shape of an operation button display relating to a type identified by the type identification information included in the microscope information received by the controller side transmitting/receiving unit is selected from the shape information indicating the shape of the operation button display stored in the storing unit, displays an operation screen on which the selected operation button display is arranged,
an instruction obtaining unit which obtains the instruction by using the operation button display, and
a controller side controlling unit which controls the controller side transmitting/receiving unit to transmit the control information, which corresponds to the instruction obtained by the instruction obtaining unit.

* * * * *